Figure 12:
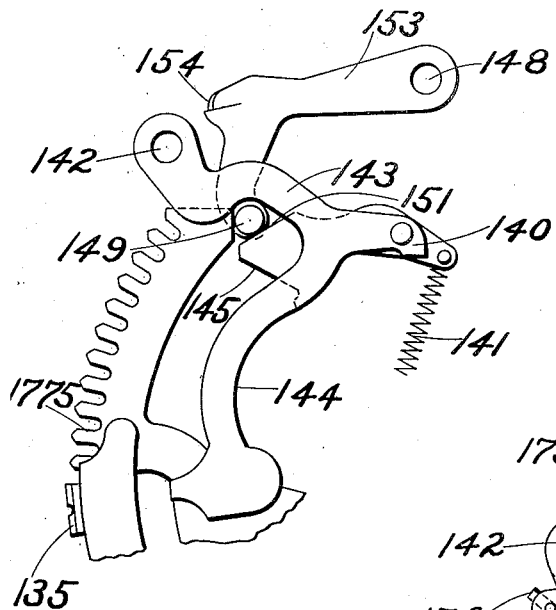
Figure 12:
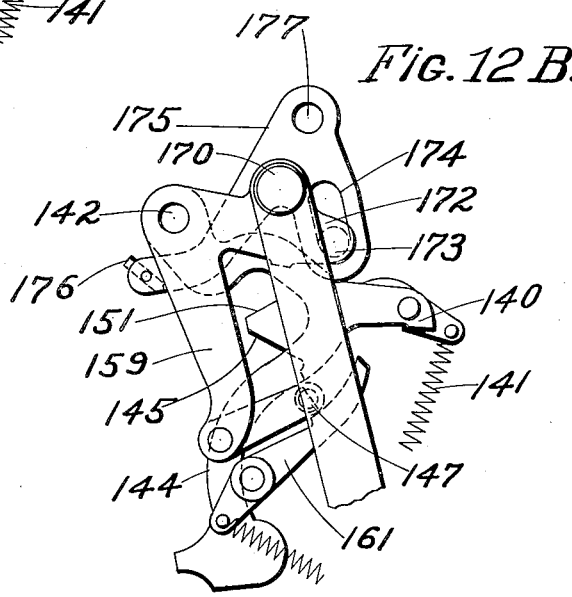

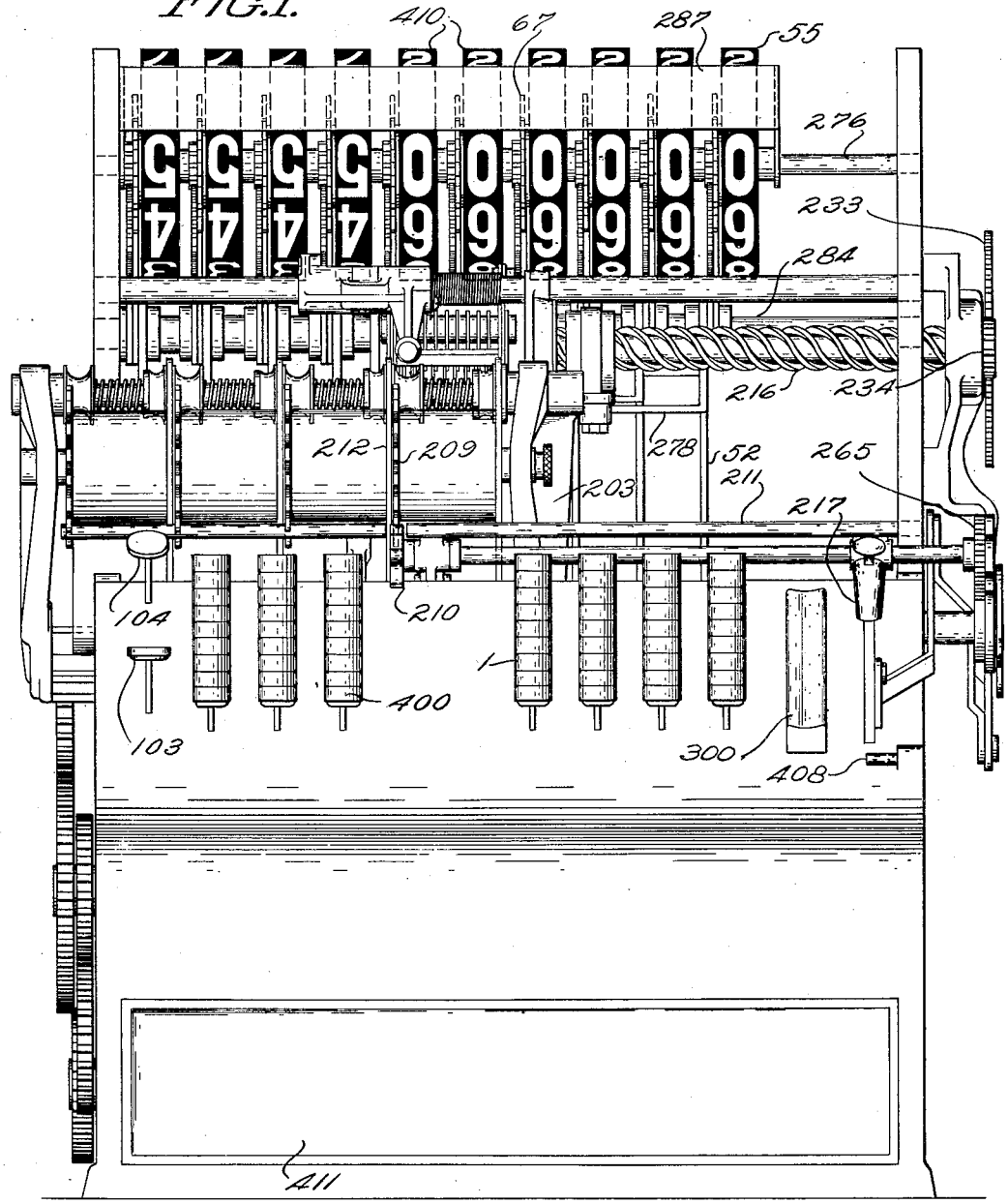

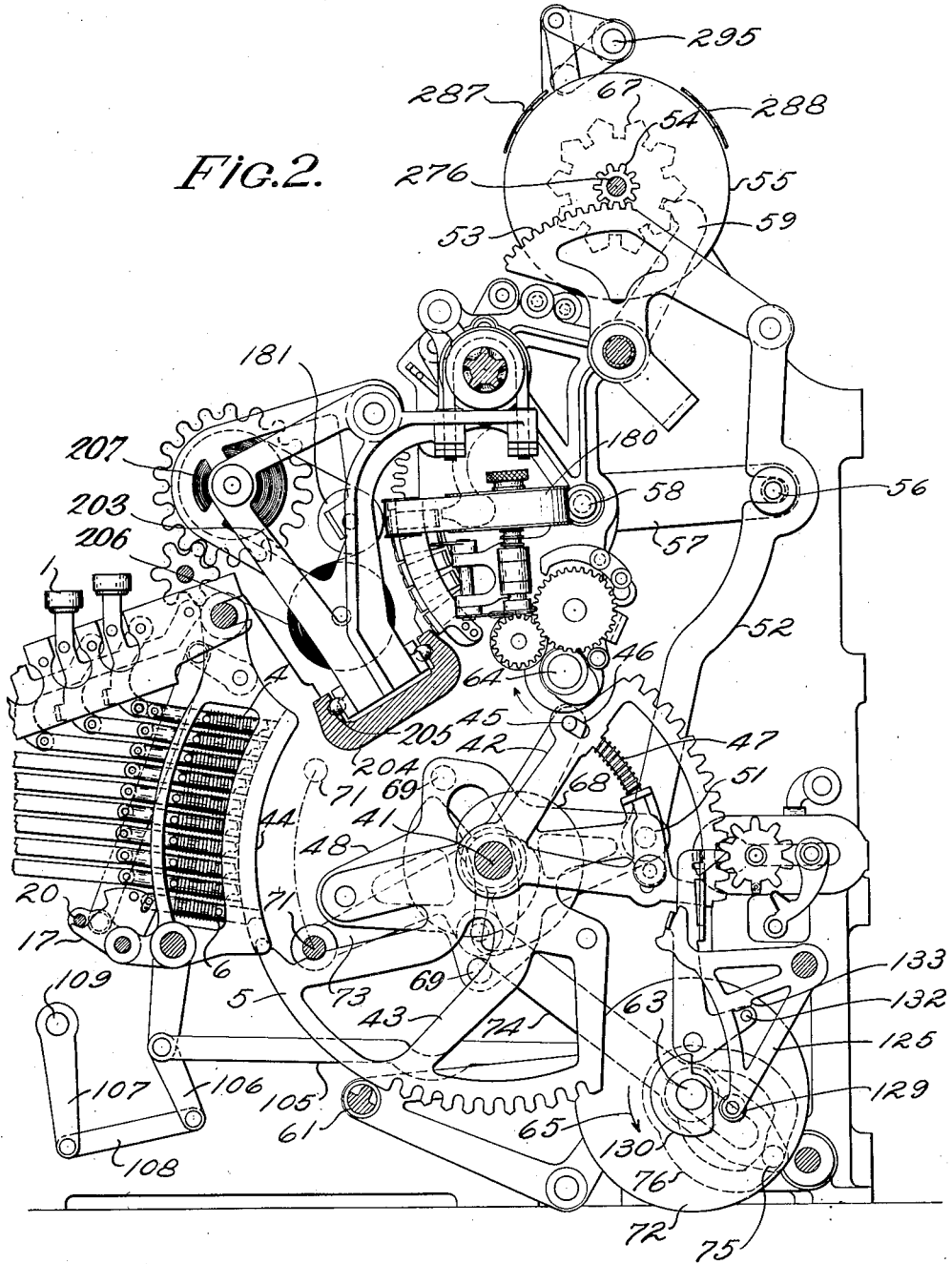

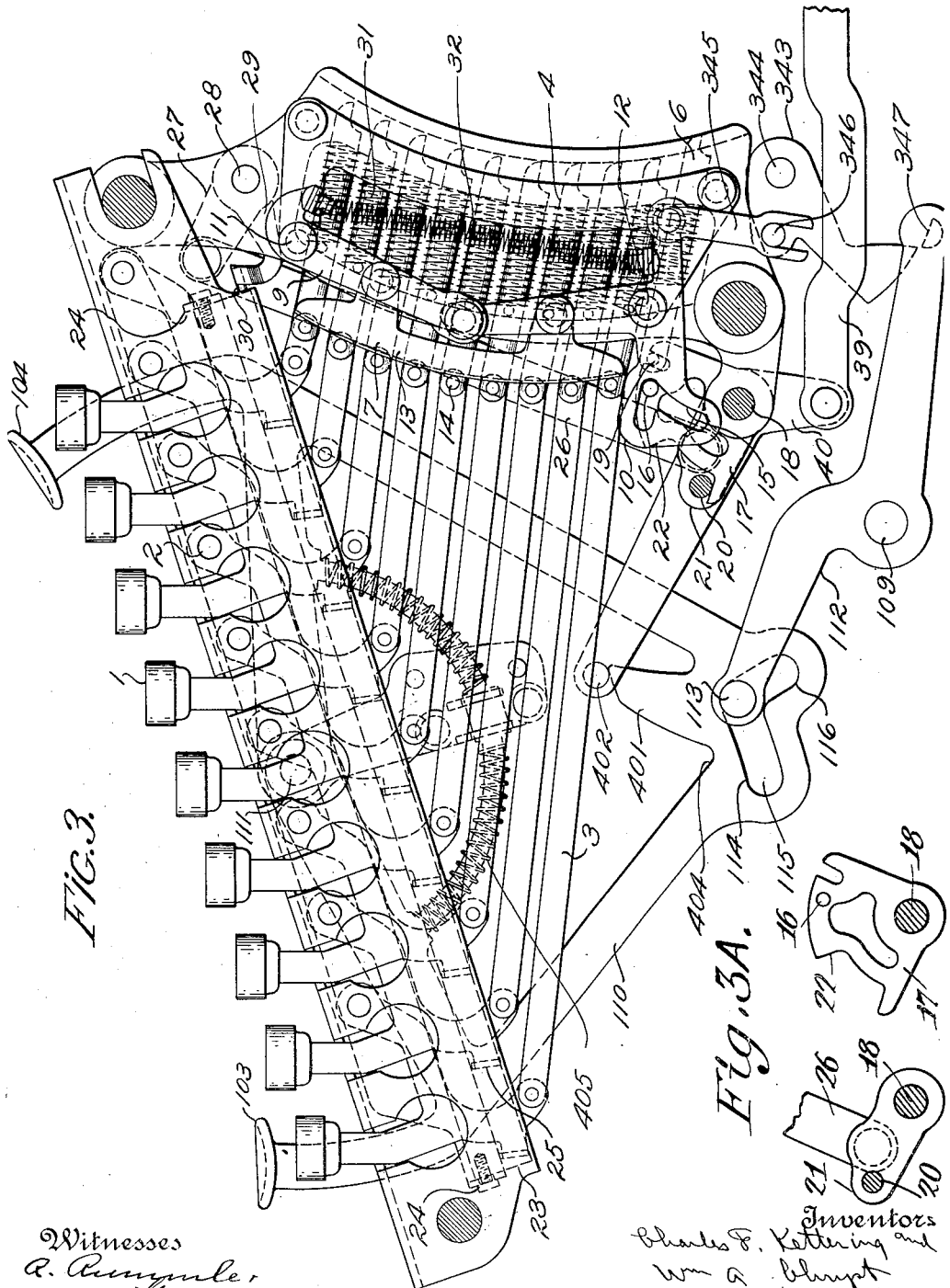

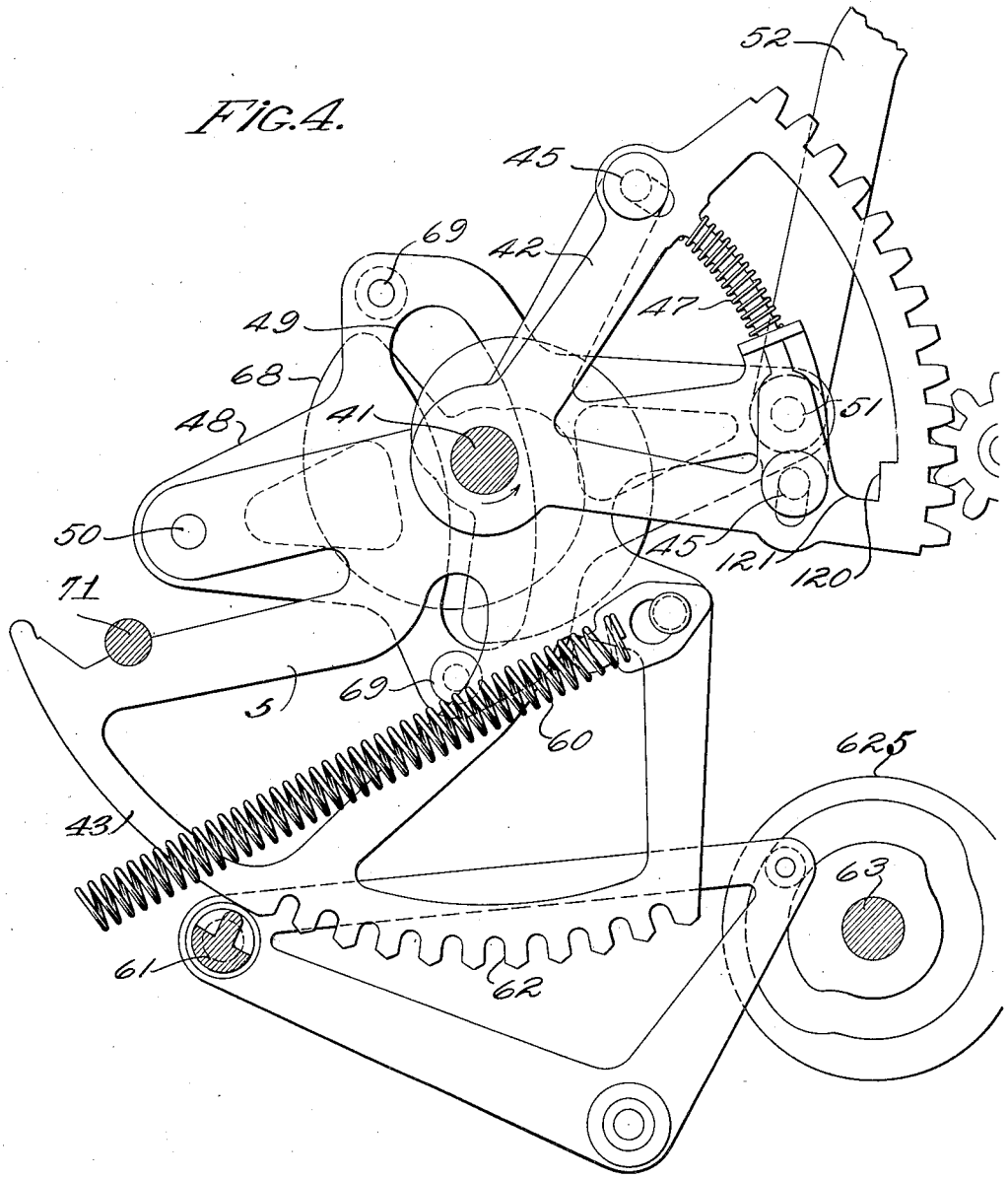

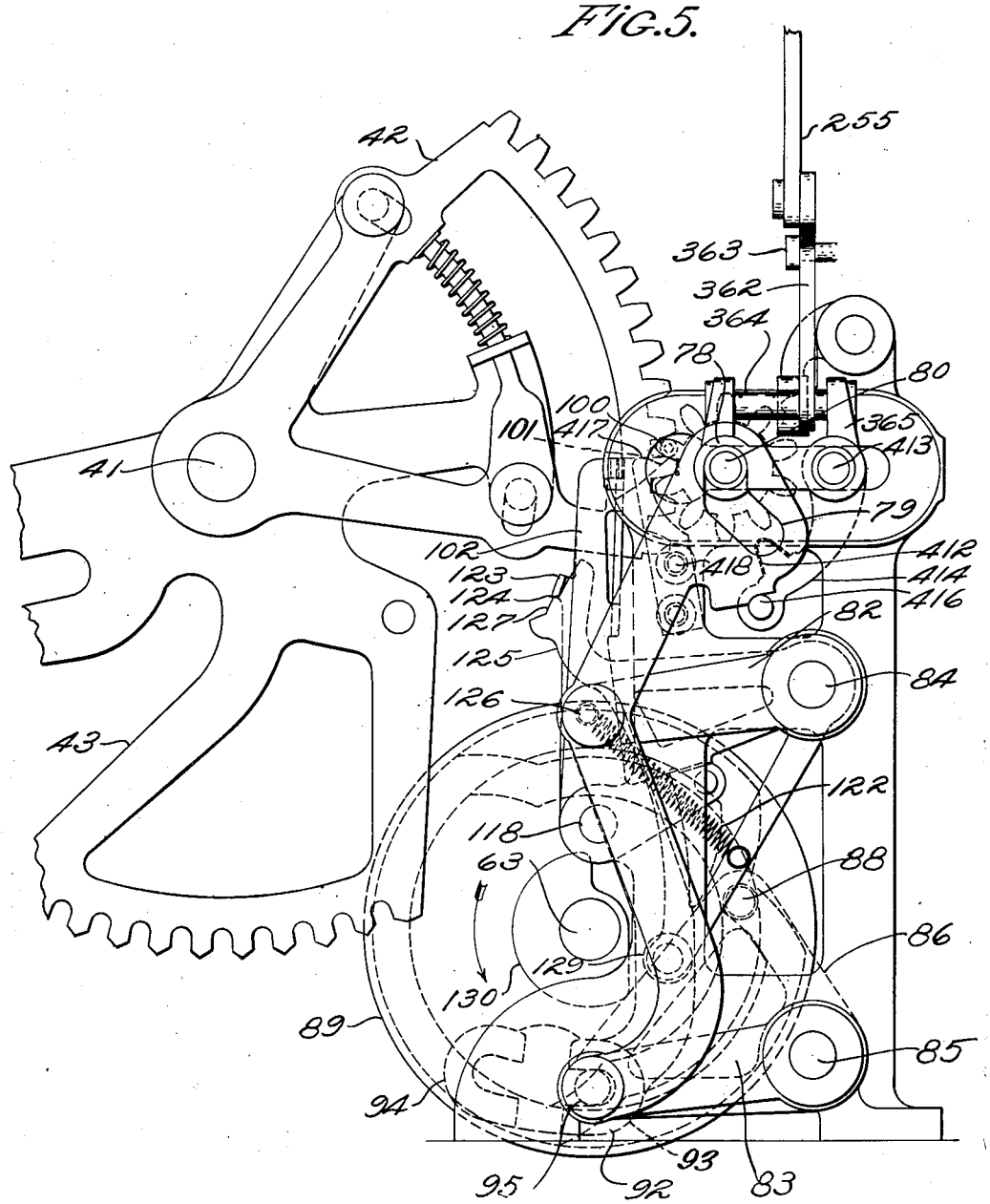

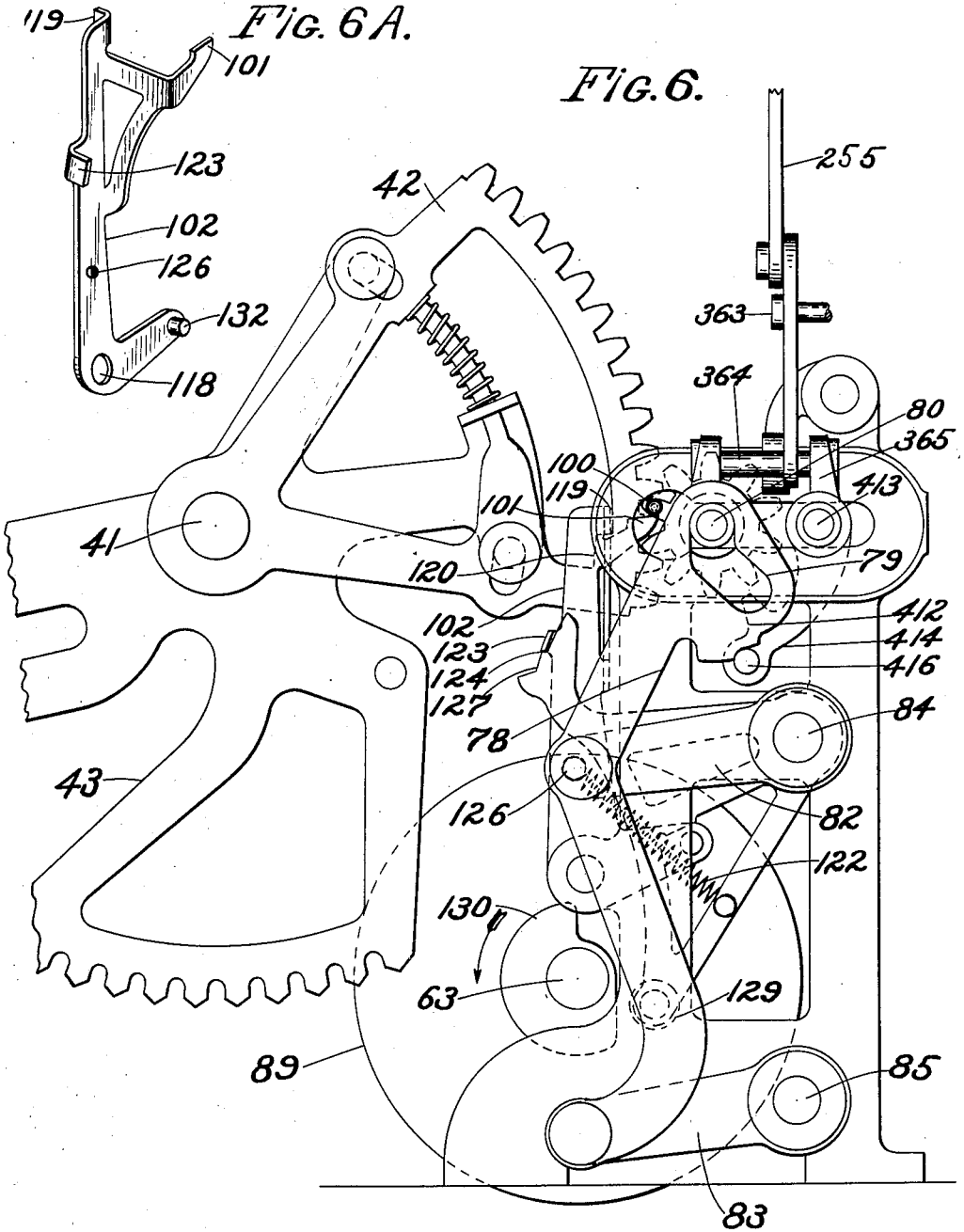

C. F. KETTERING & W. A. CHRYST.
MULTIPLE CASH REGISTER AND RECORDER.
APPLICATION FILED APR. 16, 1908.
1,151,190.
Patented Aug. 24, 1915.
22 SHEETS—SHEET 7.
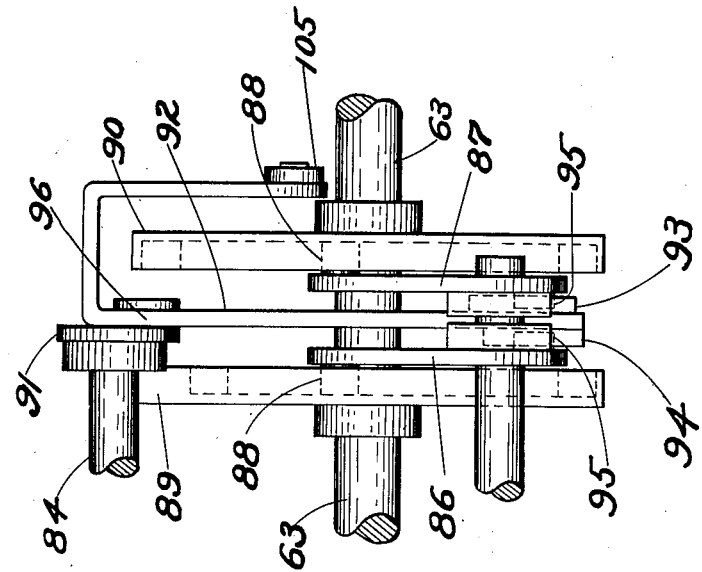
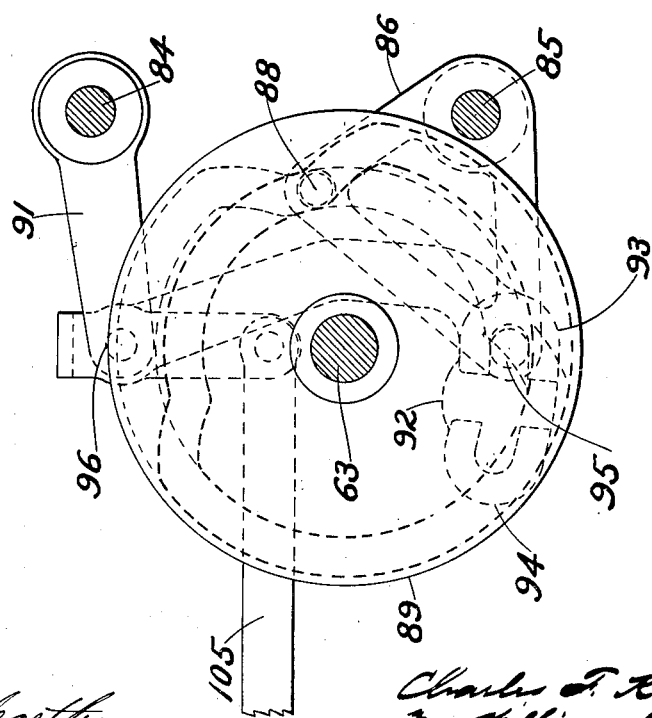
Witnesses
W. M. McCarthy
P. W. Fairchild
Inventors
Charles F. Kettering
William A. Chryst
By their Attorneys C. F. KETTERING & W. A. CHRYST.
MULTIPLE CASH REGISTER AND RECORDER.
APPLICATION FILED APR. 16, 1908.
1,151,190.
Patented Aug. 24, 1915.
22 SHEETS—SHEET 8.
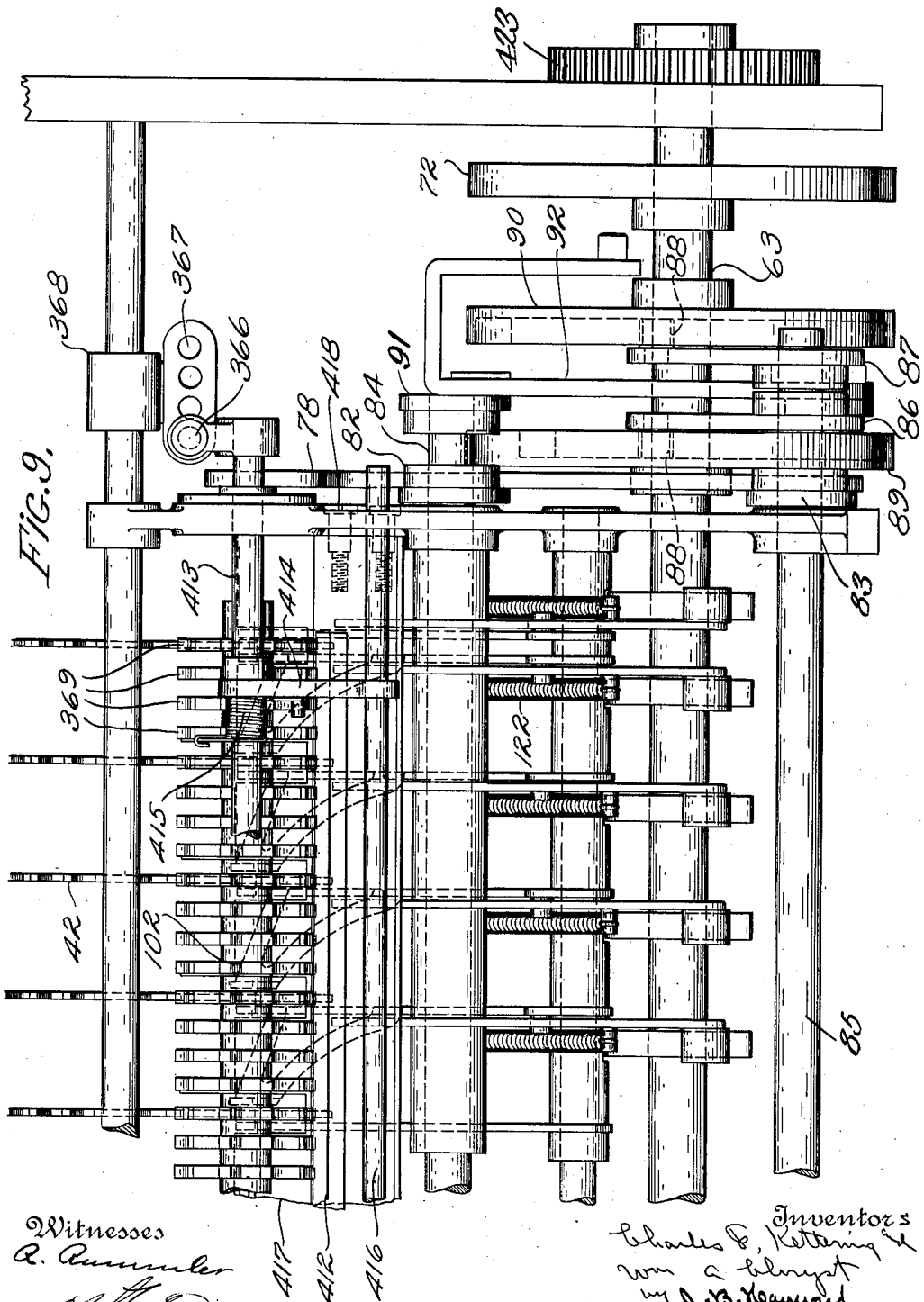

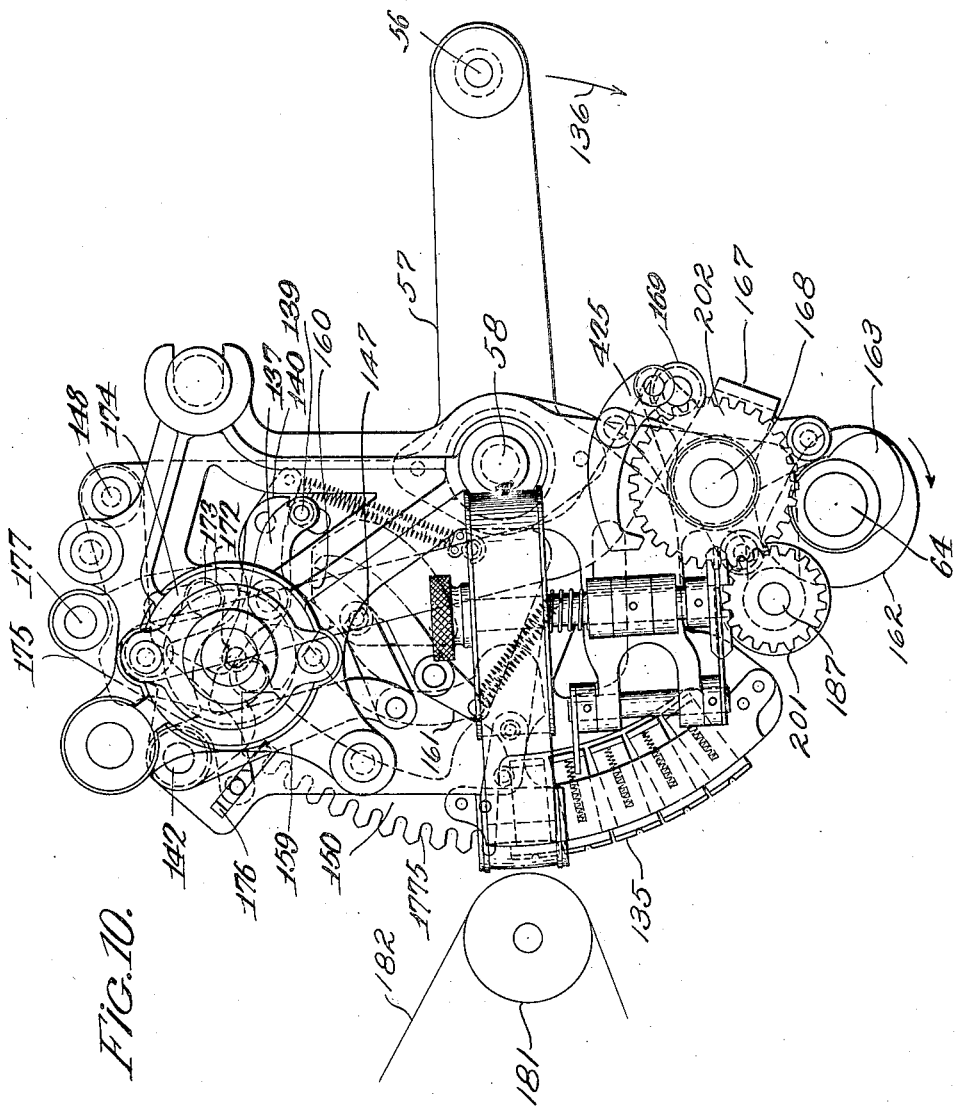

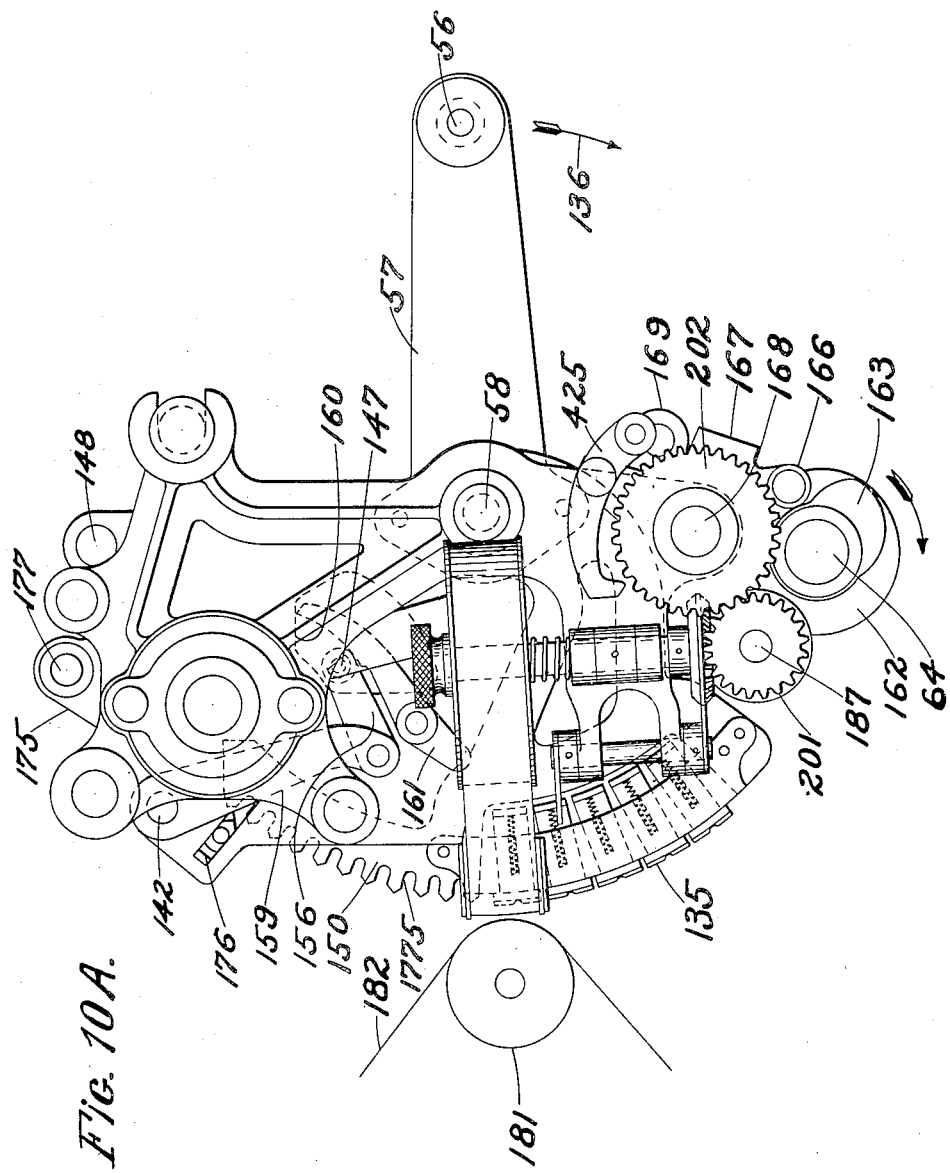

C. F. KETTERING & W. A. CHRYST.
MULTIPLE CASH REGISTER AND RECORDER.
APPLICATION FILED APR. 16, 1908.
1,151,190.
Patented Aug. 24, 1915.
22 SHEETS—SHEET 11.
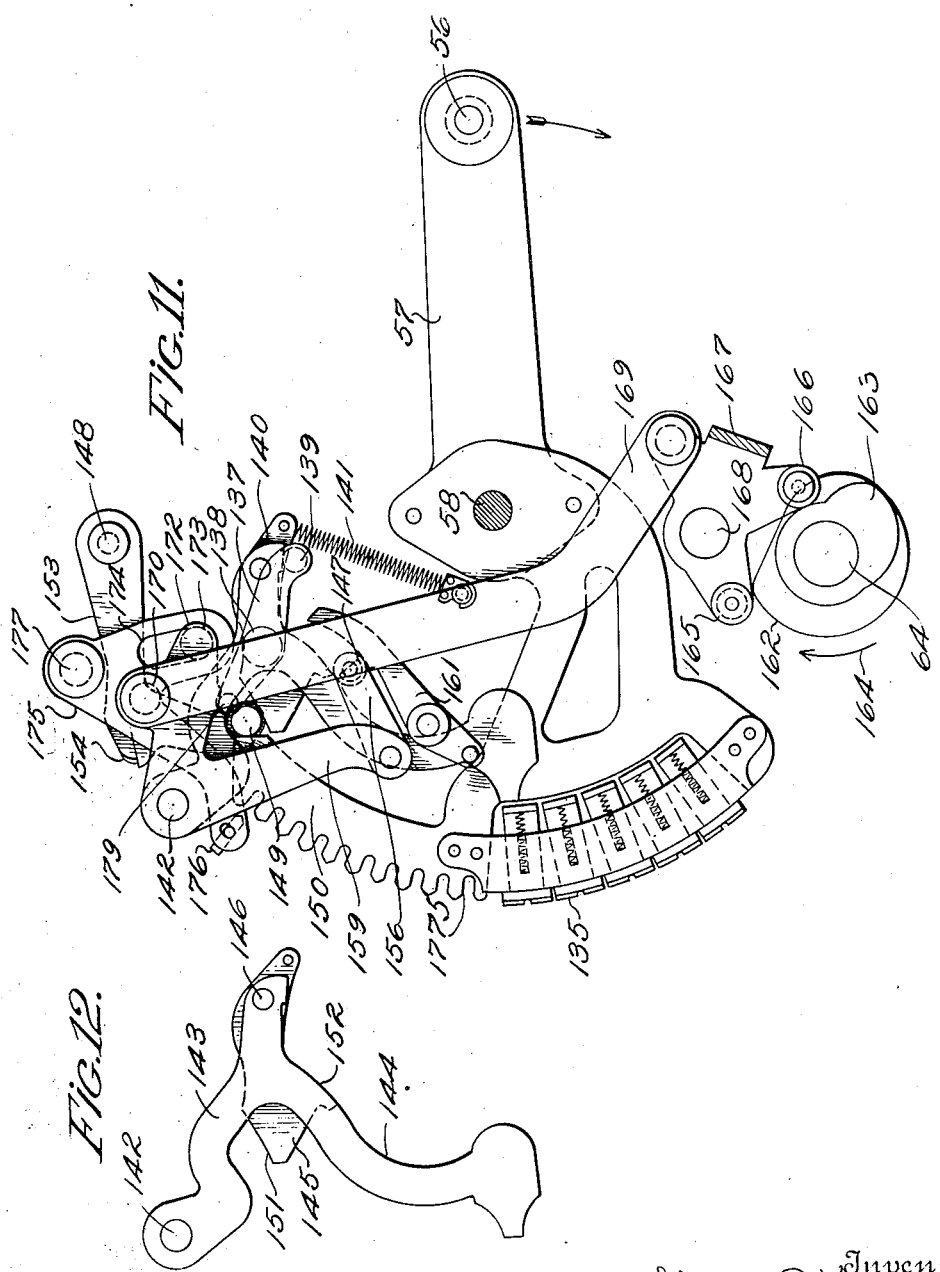

C. F. KETTERING & W. A. CHRYST.
MULTIPLE CASH REGISTER AND RECORDER.
APPLICATION FILED APR. 16, 1908.
1,151,190.
Patented Aug. 24, 1915.
22 SHEETS—SHEET 13.
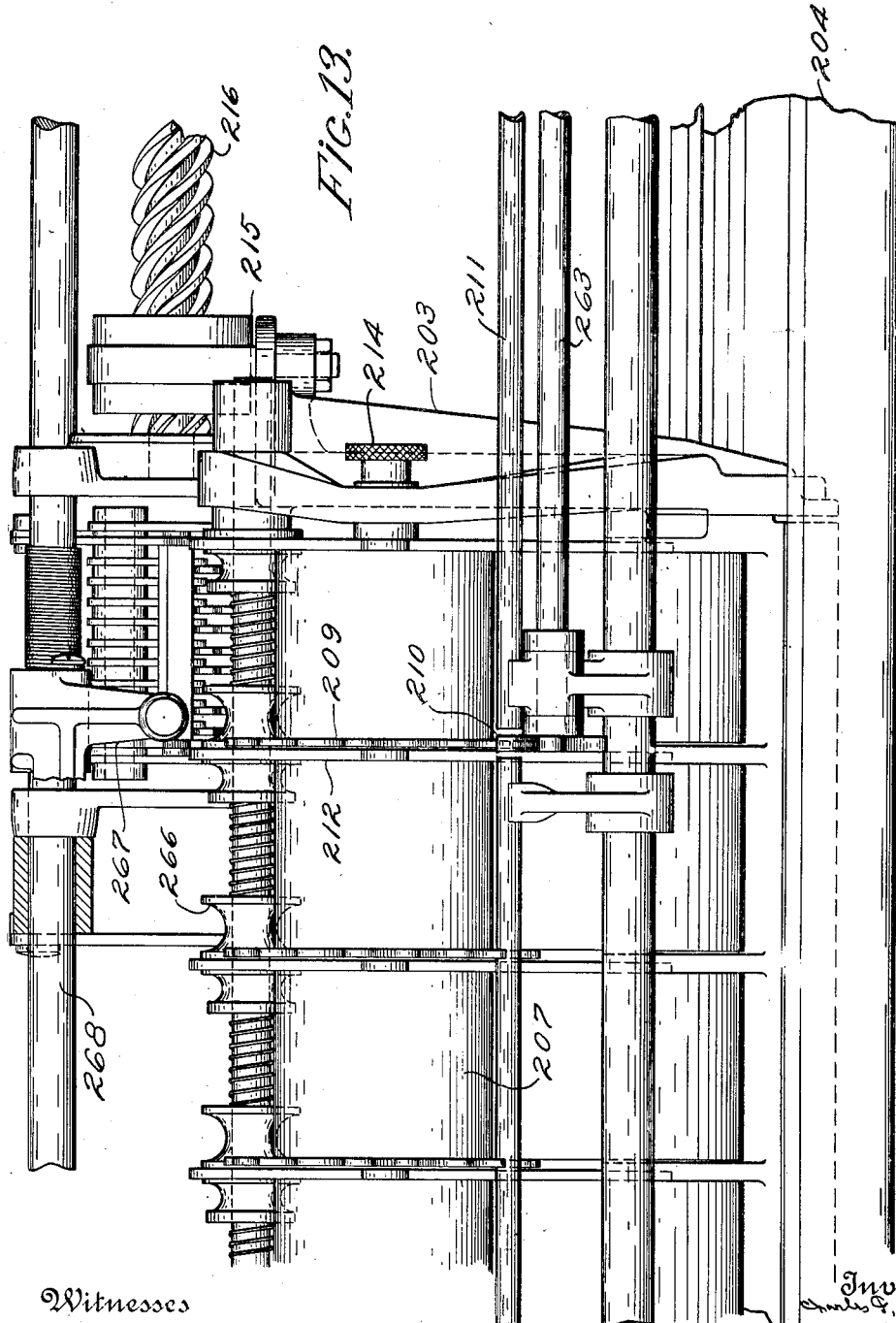

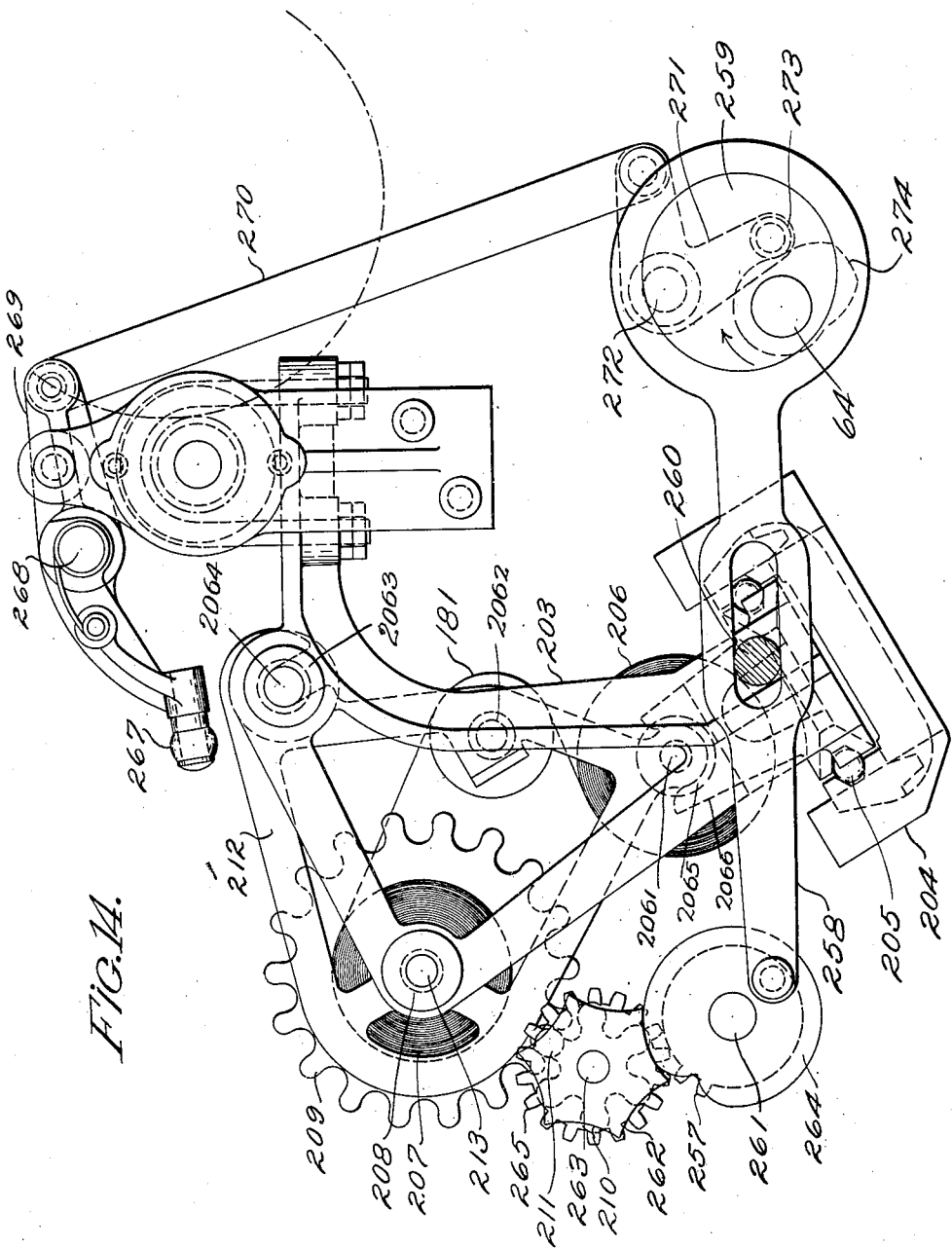

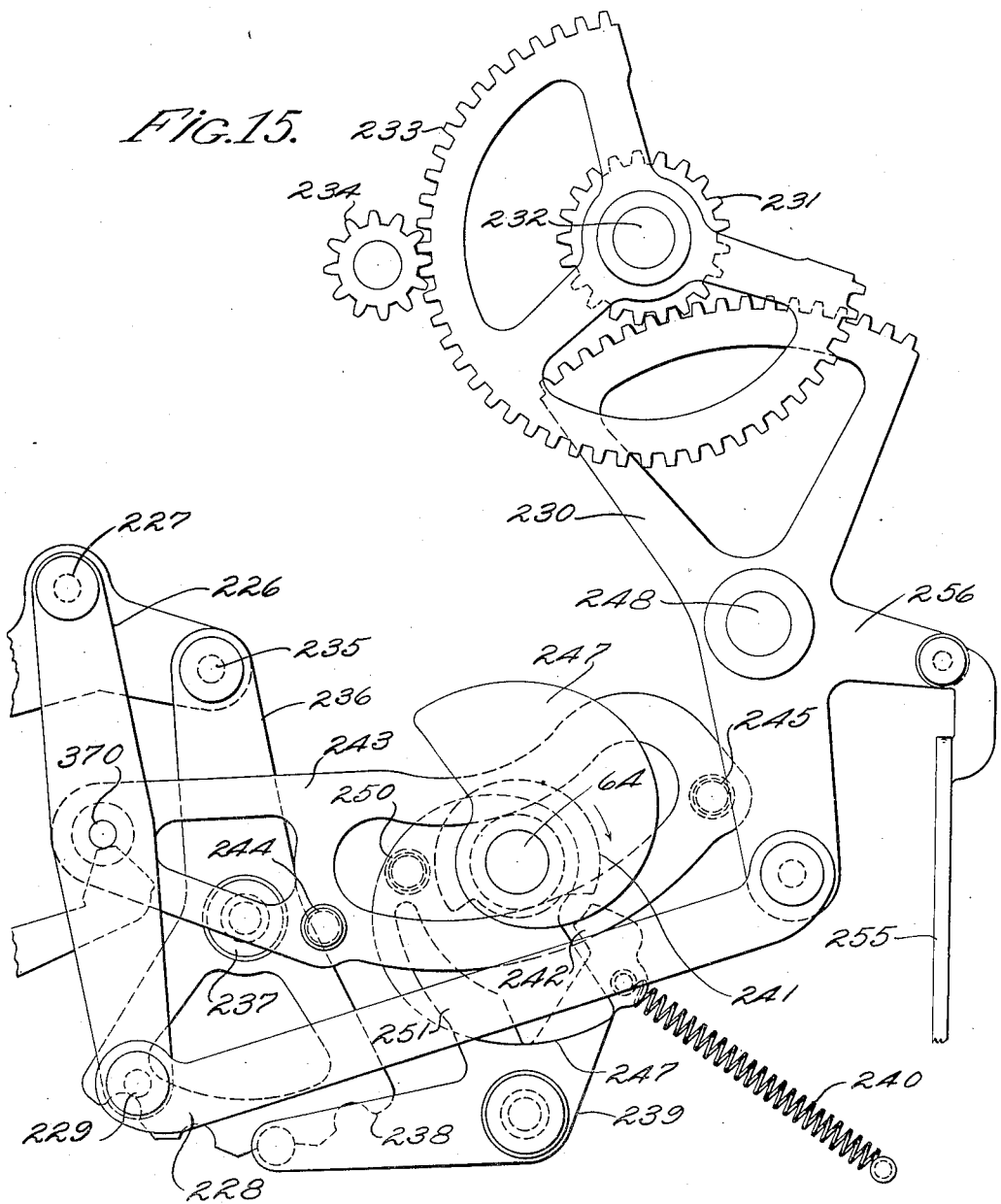

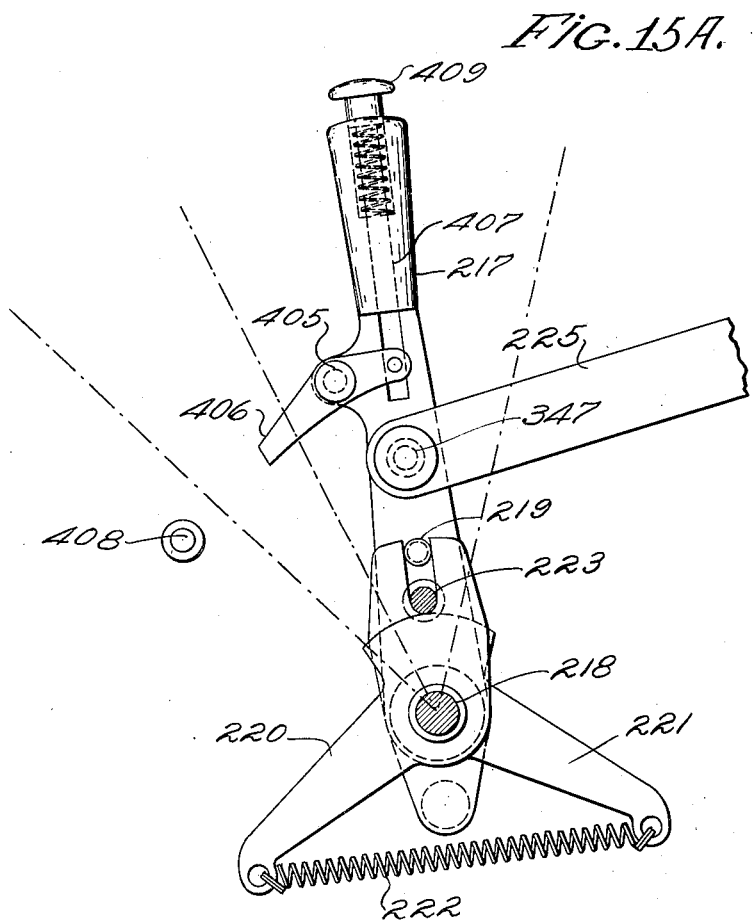

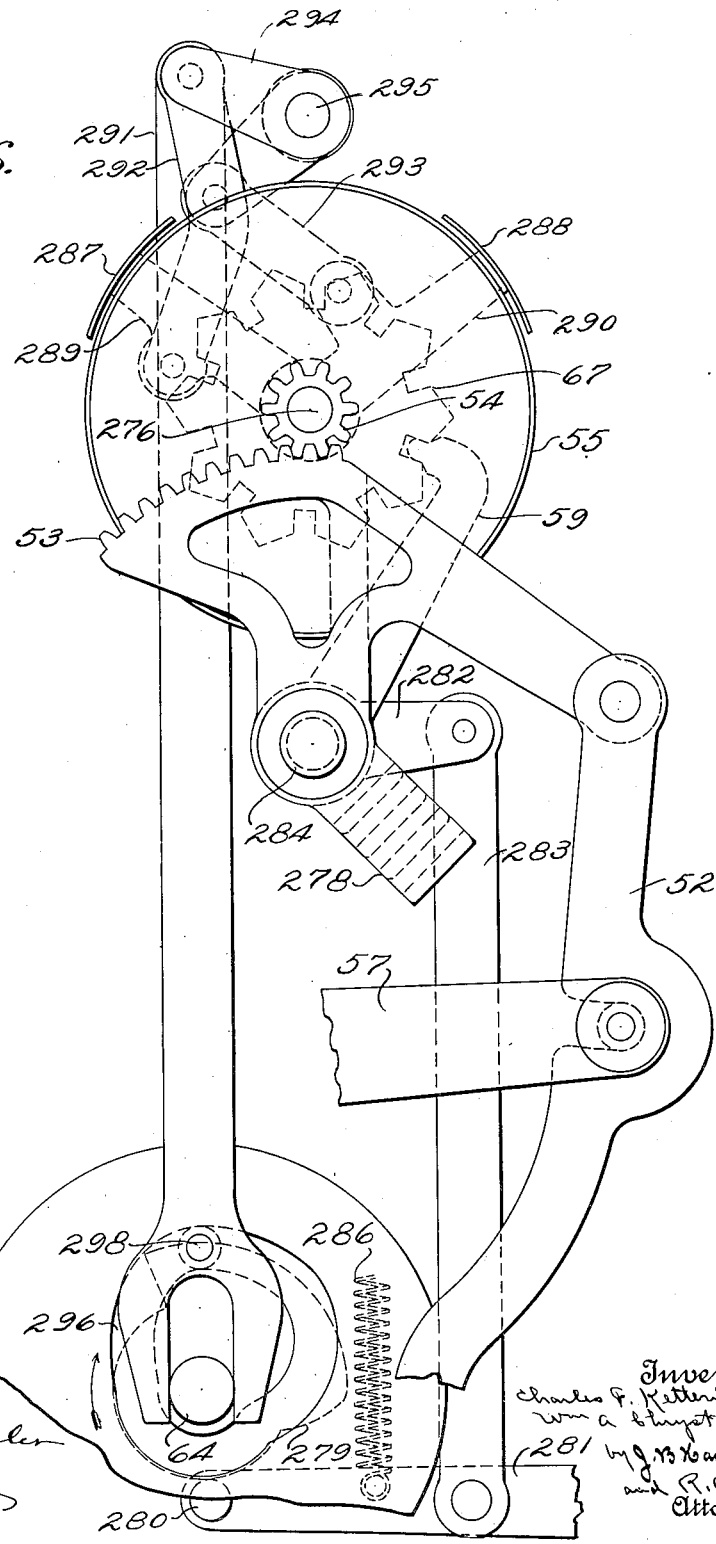

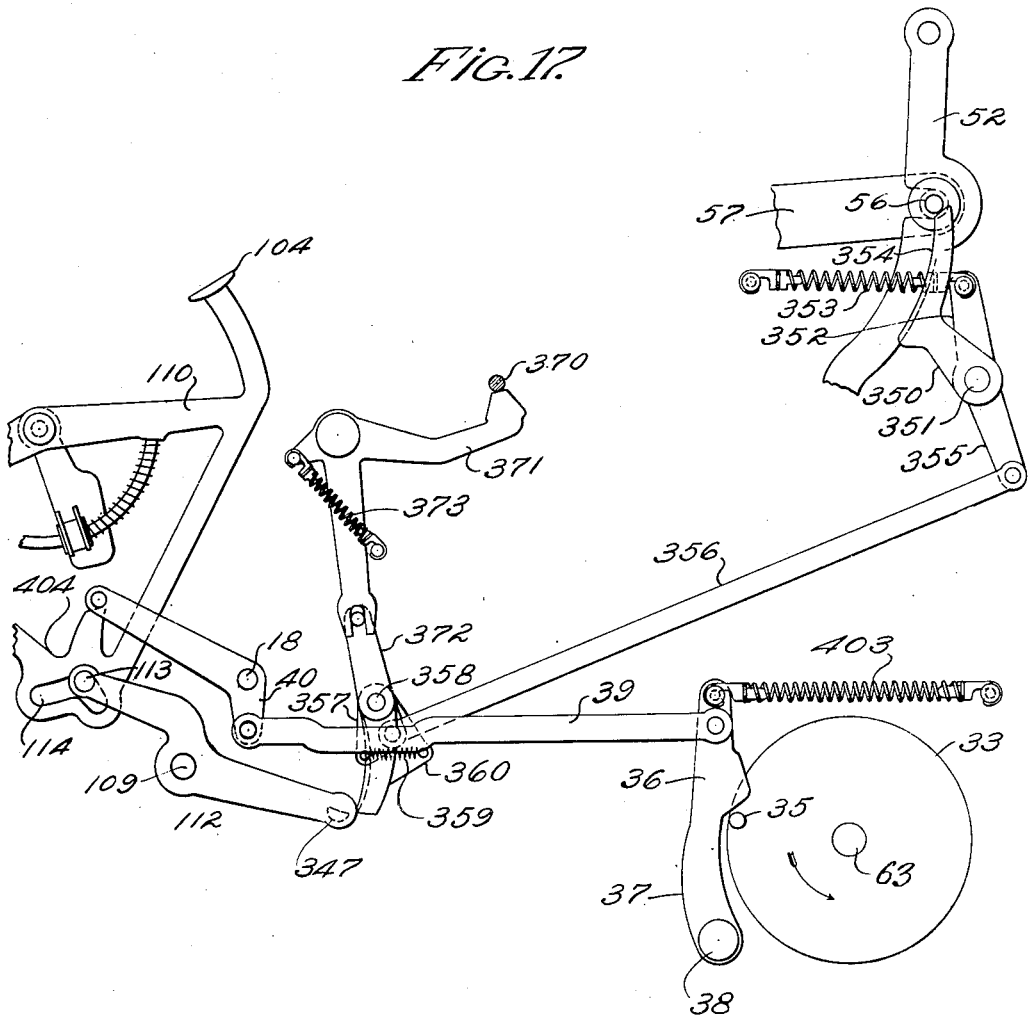

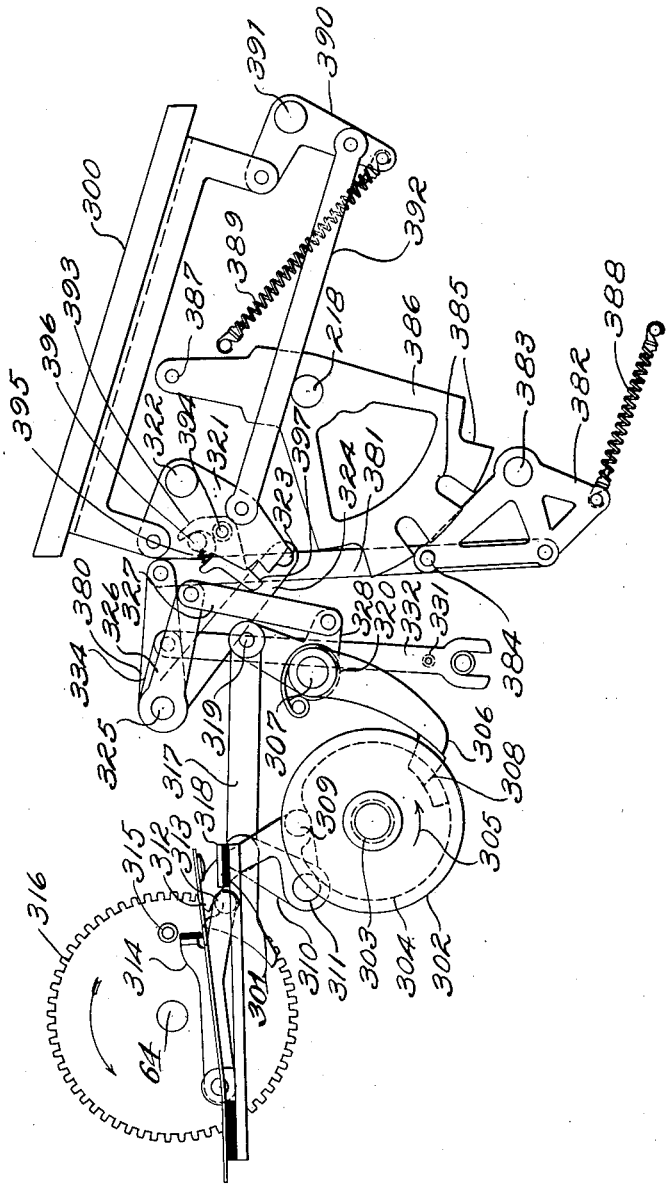

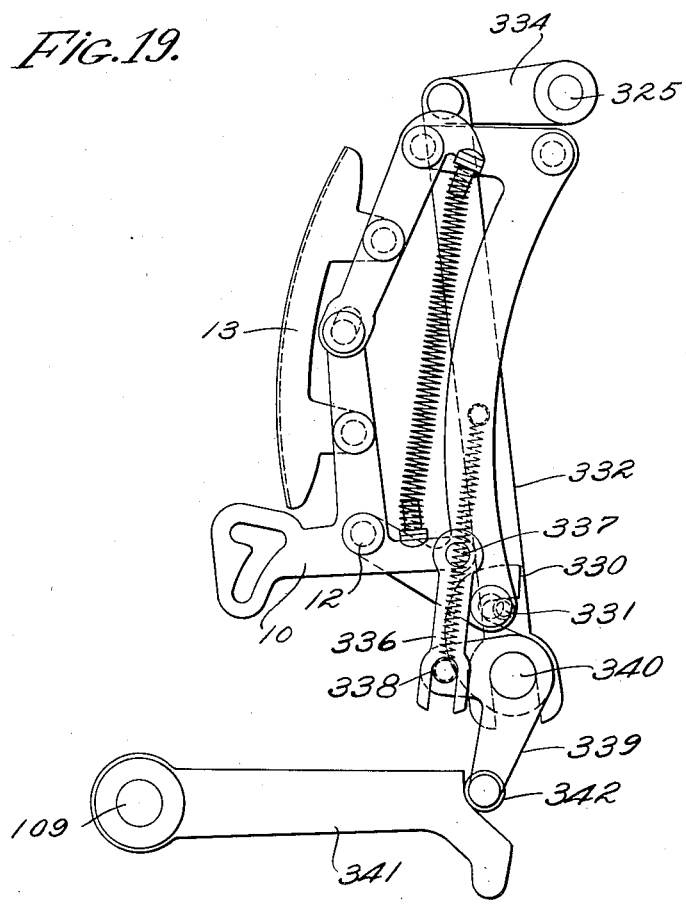

C. F. KETTERING & W. A. CHRYST.
MULTIPLE CASH REGISTER AND RECORDER.
APPLICATION FILED APR. 16, 1908.

1,151,190.

Patented Aug. 24, 1915.
22 SHEETS—SHEET 21.

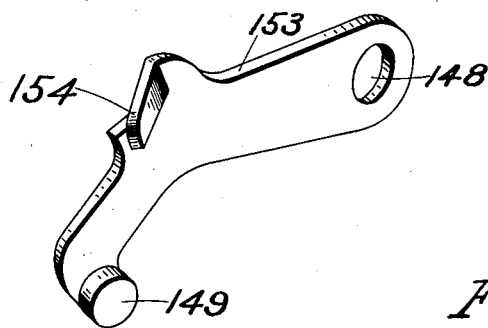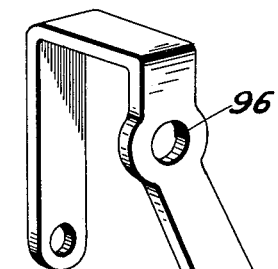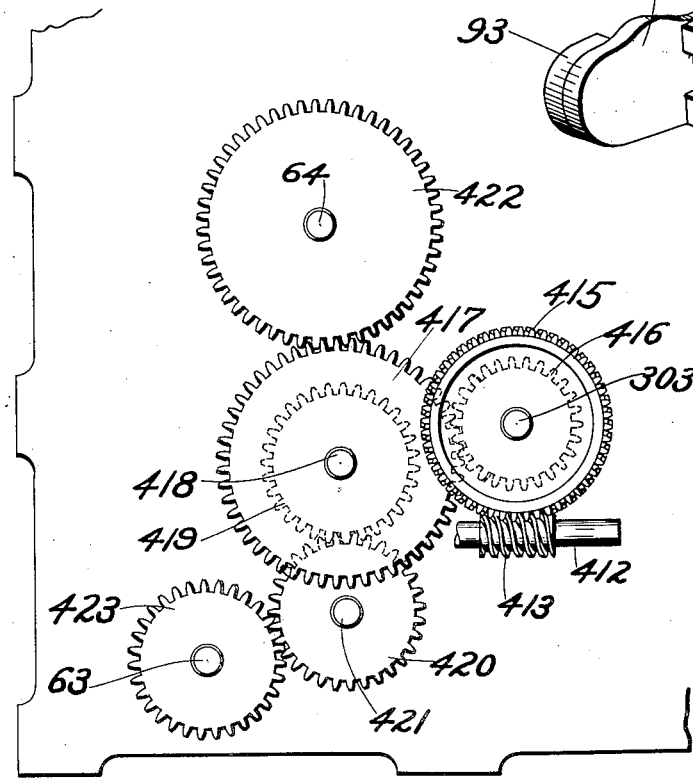

UNITED STATES PATENT OFFICE.

CHARLES F. KETTERING AND WILLIAM A. CHRYST, OF DAYTON, OHIO, ASSIGNORS TO THE NATIONAL CASH REGISTER COMPANY, OF DAYTON, OHIO, A CORPORATION OF OHIO, (INCORPORATED IN 1906.)

MULTIPLE CASH REGISTER AND RECORDER.

1,151,190.   Specification of Letters Patent.   Patented Aug. 24, 1915.

Application filed April 16, 1908. Serial No. 427,441.

*To all whom it may concern:*

Be it known that we, CHARLES F. KETTERING and WILLIAM A. CHRYST, citizens of the United States, residing at Dayton, in the county of Montgomery and State of Ohio, have invented certain new and useful Improvements in Multiple Cash Registers and Recorders, of which we declare the following to be a full, clear, and exact description.

This invention relates to cash registers.

Among the objects is to provide a cash register with a plurality of rolls of detail paper each of which may be moved into position to be printed upon by the printing devices so that records of different classes of transactions may be printed upon separate rolls of paper.

Another object of the invention is the provision of means operated by the main provision of means operated by the main operating mechanism for moving different rolls of detail paper into operative relation with the printing devices.

Another object is the provision of a multiple totalizer type of cash register in which any of the totalizers are brought into operative relation with their totalizer actuating devices by means of the main operating mechanism of the machine instead of by hand operated levers as was heretofore done.

Another object is the provision of means whereby the totalizer actuating devices normally operate a particular totalizer but a manipulative device is provided which may be set so that when the machine is regularly operated a different set of totalizer elements will be brought into operative relation with the actuating devices, but if the manipulative device is not again operated before the next operation of the machine, the next operation will effect the return of the original set of totalizer elements into position to be actuated and cause whatever amount is set up on the key board to be added thereto.

Another object is the provision of indicator mechanism which will in all ordinary operations of the machine, when amounts are being added to any of the totalizers, indicate such amounts but which will also indicate the total amount accumulated on any of the totalizers when any of them are reset to zero, thereby providing for an exhibition of the totals of all the totalizers in succession.

Another object is the provision of mechanism which will prevent the operation of the machine until both, one of the clerks' keys and the motor key have been depressed but which will permit the depression of said keys in any order or simultaneously.

Another object is the provision of a reading key and mechanism controlled thereby which will upon the operation of the machine, after the reading key has been depressed, cause the indicators to indicate the total amount which has been accumulated by the particular totalizer which is in operative position with the actuating mechanism.

Another object is the provision of a resetting key which when depressed will upon the operation of the machine cause the indicators to indicate the total amount of the particular totalizer which is in operative relation with the actuating mechanism and will also cause the totalizer to be reset to zero.

With these and incidental objects in view, the invention consists in certain novel features of construction and combinations of parts, the essential elements of which are set forth in appended claims and a preferred form of embodiment of which is hereinafter described with reference to the drawings which accompany and form part of the specification.

Figure 20:
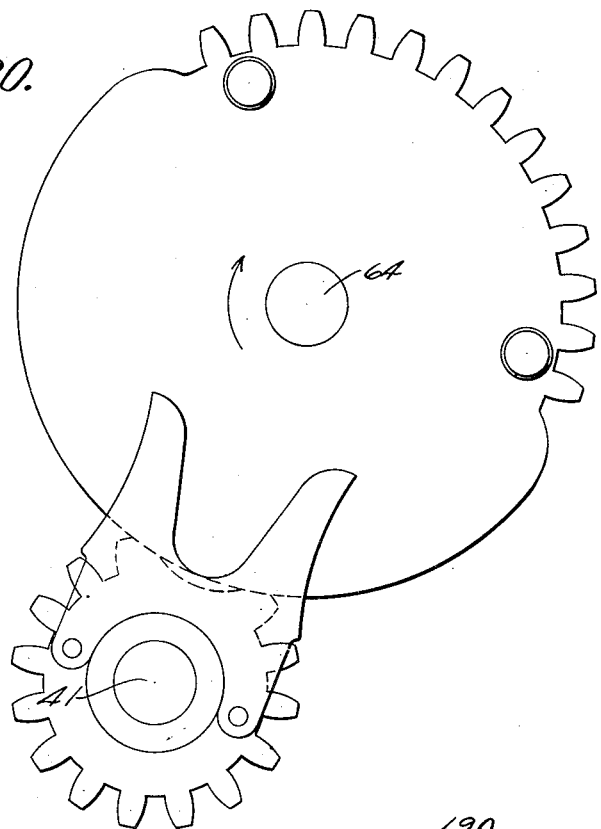
Figure 21:
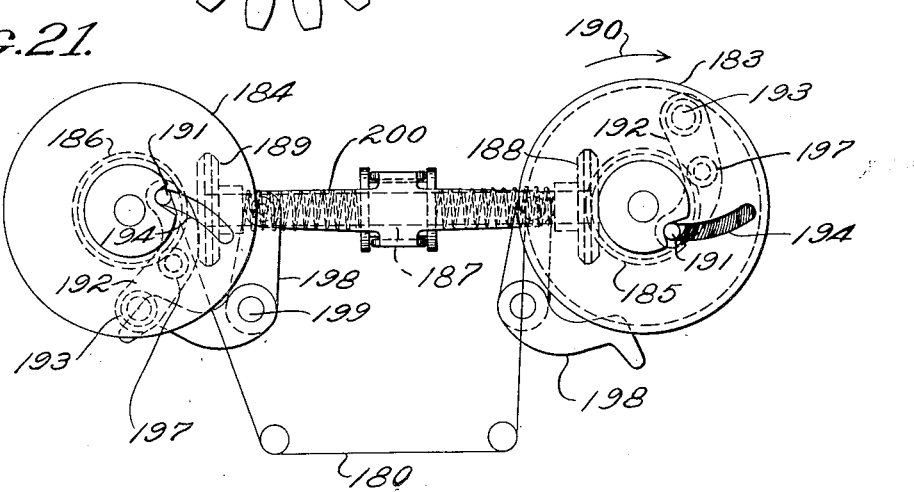

Of said drawings: Figure 1 is a front elevation of a cash register constructed according to this invention. Fig. 2 is a side elevation of the same, being partly in section and with one of the side frames removed. Fig. 3 is a side elevation of the key board. Fig. 3ᴬ is a detail of parts of the key releasing mechanism. Fig. 4 is a detail of one of the totalizer actuating segments. Fig. 5 is a side elevation of the totalizer mechanism. Fig. 6 is a view similar to Fig. 5 but with some of the parts omitted. Fig. 6ᴬ is a perspective view of one of the transfer pawls. Fig. 7 is a detail of part of the totalizer shifting mechanism, and Fig. 8 is a rear view of the mechanism shown in Fig. 7. Fig. 9 is a rear elevation of the totalizer mechanism. Fig. 10 is a side elevation of the printing mechanism. Fig. 10ᴬ is a view similar to Fig. 10, but with some of the parts omitted. Fig. 11 is also a side elevation of the printing mechanism but with the frame and other parts removed. Fig. 12 is a detail of one of the printing hammers. Fig. 12^A is a detail of one of the printing hammers and the mechanism for rocking the hammer into operating relation with the hammer actuator, and Fig. 12^B is a detail of one of the printing hammers and the mechanism for actuating the hammer. Fig. 13 is a front elevation of the detail tape carriage also showing part of the printer. Fig. 14 is a side elevation of the detail tape carriage. Fig. 15 is a side elevation of the tape carriage and totalizer shifting mechanism. Fig. 15^A is a detail of the totalizer and record strip shifting or transaction lever. Fig. 16 is a side elevation of the indicator mechanism. Fig. 17 is a side elevation of interlocking parts, between the reading and resetting key and the totalizer shifting mechanism. Fig. 18 is a side elevation of the motor key and connecting parts. Fig. 19 is a side elevation of the locking device between the clerks' keys and the motor key. Fig. 20 is a detail of a pair of mutilated gears connecting two of the main shafts of the machine. Fig. 21 is a top plan of the ink ribbon feeding device of the printer. Fig. 22 is a side elevation of the train of gears which connect the main drive shafts with the motor shaft. Fig. 23 is a perspective detail of part of the printing mechanism. Fig. 24 is a perspective detail of part of the totalizer shifting mechanism.

The entire machine constitutes the following units of mechanism which will be described in the order mentioned. First the driving mechanism, Fig. 2. Second, the keyboard which contains a set of value keys of four banks, a set of clerks' keys of three banks, a lever for controlling the position of the totalizers with respect to the totalizer actuating devices, and also controlling the positioning of the rolls of detail paper with respect to the printing mechanism, a totalizer resetting key and a reading key. The keyboard is shown in Figs. 1, 2 and 3; third, the totalizer actuating segments, Figs. 2, 4, 5, 6 and 9; fourth, the totalizers and associated parts including the totalizer shifting mechanism, Figs. 2, 5, 6, 7, 8 and 9; fifth, the printing mechanism, Figs. 2, 10, 10^A, 11, 12, 12^A, 12^B and 13; sixth, the detail ribbon carriage, Figs. 1, 2, 13, 14, 15 and 15^A; seventh, the indicator mechanism Figs. 1, 2 and 16. Lastly, the various interlocking parts between the different keys, Figs. 17, 18 and 19.

Briefly stated, the invention contemplates a cash register provided with a plurality of totalizers, with a corresponding number of detail strips, totalizer actuating mechanism and a printing mechanism, with means for bringing any desired totalizer and detail strip into operative relation with the actuating mechanism and the printer.

Indicating mechanism is provided in which the indicators are arranged to be moved from one reading directly to another without first being brought to zero positions before indicating new amounts. The indicators are also arranged to indicate the totals of the different totalizers whenever desired, and at such time the total amount is also printed upon the corresponding detail strip.

The mechanical arrangement of the machine consists of a series of centrally located segment gears which are adapted to operate the totalizer pinions; the keyboard is arranged in front of the segment gears and controls the extent of rotation of the same; above the segment gears is a printing mechanism the setting of which is determined by the extent of rotation of the segment gears; a carriage which supports several rolls of detail strips is arranged to be shifted across the front of the printer for the purpose of bringing different rolls of paper into printing positions; the totalizers are arranged at the rear of the segment gears and are shiftable across the segment gears, for the purpose of bringing different sets of totalizer elements into operative relation with the actuating segments; the indicator drums which are journaled at the top of the machine are rotated from the positions at which they were left at the end of the preceding operation directly to their new positions by connections controlled by the corresponding segment gears and actuated by the main driving mechanism. Mechanism for controlling the moving of the totalizers into and out of mesh with the actuating segments for the purpose of permitting the segments to rotate the totalizers in a forward direction only as when amounts are being added to the totalizers or in a reverse direction for resetting, or in both directions when a reading only is to be taken, and other connecting mechanism will all be described in detail in connection with the main elements of the machine.

*Driving mechanism.*—The armature of the motor which drives the machine is mounted on the shaft 412 (Fig. 22). This shaft is provided with a small worm gear 413 which meshes with a worm gear 415 on the stub shaft 303. The shaft 303 carries the gear 416 meshing with the gear 417. This gear is carried by a small stub shaft 418 to which is secured the gear 419 meshing with a gear 420 on the stub shaft 421. The gear 417 meshes with a gear 422 carried by the shaft 64 and the gear 420 meshes with a gear 423 carried by the shaft 63. These two shafts 64 and 63 are the main drive shafts of the machine and the controlling means of the motor permits the motor to rotate shaft 412 the proper number of times for causing the shafts 64 and 63 to make one complete rotation each time the motor key is depressed. The mechanism by means of which the motor is controlled is illustrated by Fig. 18 and is described in connection with the description of Figs. 17, 18 and 19 under the heading of "Motor key and connecting mechanism".

*Keyboard.*—The keyboard comprises a plurality of banks of amount keys, each bank of which controls the extent of oscillation of one of the totalizer actuating segments. Each bank of keys comprises nine keys numbered from 1 at the bottom of the bank to 9 at the top. The amount keys 1 are each pivoted at 2 (Fig. 3) to the frame of the machine and are each connected by links 3 to plunger stops 4 which serve to limit the forward movement of the totalizer actuating segments 5. The plungers connected to the one keys serve to stop the respective segments after the same have traveled two units of movement. The first unit of movement of a segment does not effect its totalizer pinion but serves to restore the segment to zero position in case the segment has been moved from such position in a transferring operation which will be described later. If the nine key of any bank is depressed the respective totalizer segment of said bank will move forward until it abuts the nine plunger in which case it will have traveled far enough to register nine upon the totalizer. Each bank of keys is provided with a zero plunger 6 which projects into the path of a totalizer segment and normally prevents the segment from going beyond the zero position. However, if one of the amount keys is depressed the corresponding zero plunger will be withdrawn permitting the passage of the segment, the plunger which is connected to the amount key depressed then serving to stop the segment.

A parallel motion device 7 (Figs. 3 and 19) for causing the zero plunger to be withdrawn upon the depression of any amount key of its respective bank is mounted at the side of each bank of plungers. A pair of levers 9 and 10 pivoted at 11 and 12 respectively, support the part 13 of each of the parallel motion devices. The part 13 is arranged to be engaged by pins 14 projecting from the plungers 4 and when so engaged will swing the levers 9 and 10 inwardly upon their pivots 11 and 12. The lever 10 is provided at one side with a cam slot 15 through which slot projects a pin 16 which extends from the side of a lever 17. The lever 17 is loosely mounted on a shaft 18 and at 19 forks over a pin on the end of the zero plunger 6. When an amount key is depressed the plunger to which it is connected forces the member 13 inwardly swinging the lever 10 on its pivot 12 and causing the cam slot 15 to engage the pin 16 and force the lever 17 upon which the pin is mounted outwardly and thereby withdraw the zero plunger from the path of the segment. At the end of an operation of the machine the shaft 18 is rocked so that a rod 20 mounted on arms 21 extending from this shaft engages the edges 22 of such of the levers 17 as have been rocked forwardly and returns the same. By so doing the zero plunger will be returned to its normal position in the path of the segment and when the zero plunger is returned to such position the parallel motion device will also return to its original position being aided in its return by a tension spring 32. This spring is secured to the levers 9 and 10 and urges the same to spring outwardly a moment before the rod 20 engages the lever 17. Depressed keys are retained in depressed position against the action of springs 31 which encircle the key plungers 4 by means of key detent plates 23. Each key detent plate 23 is pivoted at 24 to the frame of the machine and rocks over a projection 25 of a key when a key is depressed and retains the key depressed until the completion of the operation of the machine at which time a shaft 28 is rocked through the rocking of the shaft 18 which is connected by the arms 21, links 26, and levers 27, to the shaft 28. Camming members 29 are mounted on the shaft 28 and are arranged to cam the detent plates 23 out of engagement with the depressed keys. The cam members 29 are merely levers bent so as to present inclined surfaces to pins 30 on the detent plates. The shaft 18 is rocked by means of a cam member 33 which is mounted on the shaft 63 (see Fig. 17). A pin 35 is mounted on the side of the cam member 33 and is so placed that just before the machine comes to rest at the completion of an operation the pin 35 will engage a projection 36 on a lever 37 which is pivoted at 38 to the frame of the machine and cause said lever through a link connection 39 and lever 40 secured to the shaft 18 to rock the shaft 18.

*Differential mechanism.*—There are four totalizer actuating segments 5 one for each bank of amount keys, which with the parts which are operated by the totalizer actuating segments are all alike so that the description of but one of the totalizer actuating segments and the mechanism which is operated thereby will suffice for all. These segments are loosely mounted on a shaft 41 (Fig. 4) and are made in two parts. The part 42 is a segment gear arranged to mesh with the counter pinion. The part 43 is arranged to travel in a track 44 (Fig. 2) which is cut in the supporting frame of the key plungers and into which the key plungers project when keys are depressed. The parts 42 and 43 of the segments are connected by means of pins 45 projecting from the member 43. These pins 45 project through slots 46 in the members 42 and permit a certain amount of free movement of the member 42 in regard to the member 43. Springs 47 mounted between the members 42 and 43 normally urge said members to remain in a certain relation to one another. The independent movement between the two members is equal to one tooth space of a totalizer pinion, and this loose connection is for the purpose of allowing the member 42 to travel one unit of movement farther than the member 43 when the member 43 is limited in its movement by one of the key plungers and it is necessary to rotate the totalizer pinion with which the member 42 meshes an additional tooth space for the purpose of turning in a transfer to such totalizer pinion from the totalizer pinion of next lower order. The method of transferring will be described in connection with the totalizer mechanism but this lost motion connection between the two members of the segment is mentioned to explain their construction. Another fact that may be here mentioned in explanation of the construction of the segments is that the segments in operations of addition do not engage the totalizer pinions when the segments are being set but do engage when the segments are being returned to their initial positions, in which they are shown in the drawings.

The differential movement of the segments is imparted to the indicator mechanism for the purpose of setting the same and to the printer for the purpose of bringing particular type to the printing line by means of a set of walking beams 48, the shape of which is best shown in Fig. 4. Each beam is cut away at 49 to clear the shaft 41 and is pivoted at its end 50 to the member 43 of the corresponding segment and at its opposite end 51 it is pivoted to a link 52 which connects to a segment gear 53 (Fig. 16) meshing with a pinion 54 secured to the side of an indicator drum 55. At 56 (Fig. 2) the links 52 have open slots engaging rollers 56 on arms formed on the type carrying segments 57 of the printer. The type carrying segments are pivoted at 58 and any movement of a link 52 will cause a proportionate movement of the connected type carrying segment on its pivot and thereby bring the corresponding type to the printing line. During the forward movement of the segment the beam 48 will rock on the pivot 51, movement of the link 52 being prevented at this time by an indicator alining pawl 59.

The forward movements of the segments 43 are effected by means of springs 60 (Fig. 4) and when any segment has reached its forward position, being stopped by one of the plungers 4, it will be locked in such position by a locking or alining device 61 (Figs. 2 and 4) which enters one of a series of notches 62 formed on the member 43. The alining devices 61 extend under all of the members 43 and are operated by means of cams 625 on the shaft 63, which, as before stated, is geared to the main drive shaft 64 (Fig. 22) so as to make one complete rotation at each operation of the machine, the direction of rotation being shown by the arrow 65 in Fig. 2. When the segments have reached their forward positions and are locked in such positions by the member 61 the indicator alining pawls 59 will be disengaged from the toothed members 67 of the indicators and will thereby permit rotation of the indicator drums and also movement of the links 52. At this time the shaft 41 is given a complete rotation by means of a pair of mutilated gears shown in Fig. 20 which transmit motion from the main drive shaft 64 to the shaft 41. Cams 68 are rigidly mounted on the shaft 41, one on each side of each rocking beam 48. Each beam 48 carries a pair of rollers 69 (Fig. 4) one of which rollers will be moved into the path of one of the cams 68 when the beam 48 is rocked on its pivot 51. This, whether the roller is moved into or out of the path of one of the cams, depends upon the position in which the pivot 51 is left on the preceding operation of the machine. When the shaft 41 rotates, one of the cams 68 will engage the roller 69 which is in its path and cause the end 51 of the beam to be rocked to a position which corresponds to the position in which the end 50 of the beam has been rocked by movement of the segment 5. This will cause the link 52 to position the typecarrying segment 57 to which it is connected and to rotate the indicator drum 55 to a position corresponding to the number of units of movement which the segment 5 was given. The principal object of this method of connecting the differential mechanism with the indicator and type segments is that no matter in what positions the indicators or type segments have been left by the last previous operation of the machine they will be directly moved to the next desired position without being first returned to some normal or zero position.

A bar 71 is caused to return the actuating segments to their initial position after the setting of the type segments and indicators, by means of cams 72 (Fig. 2) which cause the bar 71 to move downwardly from the position shown in dotted lines in Fig. 2 to that shown in full lines. The bar 71 is supported between a pair of arms 73 which are loosely mounted at each side of the machine on the shaft 41. Each of the arms 73 is connected to one of the cams 72 by a pitman 74 bearing a roller 75 which extends into a cam groove 76 in the cam. The cam grooves are so formed that at the beginning of each operation of the machine the bar 71 will be elevated to the position shown by dotted lines in Fig. 2. It will there be held until the shaft 41 has made a complete rotation and will then be returned to the position shown by full lines in Fig. 2 carrying with it the totalizer segments 5. It is during the return of the totalizer actuating segments that the segments impart their movement to the totalizers.

The segments which are controlled by the clerks' keys do not actuate a totalizer but serve to control the positioning of certain type carriers of the printing device and so cause the recording of the clerk's number.

*Totalizer mechanism.*—Multiple totalizers are used in this machine but the totalizer mechanism will first be described as embodying only one set of totalizer pinions. The totalizer moving mechanism is arranged so that in ordinary operations of the machine the totalizers will first be moved out of mesh with the actuating segments so that the segments will not turn the totalizers during their forward movement and, while the segments are at rest in their forward positions, the totalizers will be moved into mesh with the same so that upon the return of the segments the totalizers will rotate a distance corresponding to the forward movement of the segments. The totalizers are shifted into and out of mesh with the segments by means of camming devices or members 78 (Fig. 5). These devices are provided with inclined slots 79 through which the totalizer shaft 80 extends. The operating mechanism is arranged to cause this cam device to move upwardly before the totalizer actuating segments are permitted to move forwardly under the action of their springs. The upward movement of the members 78 causes the slots 79 in said members to cam the totalizer shaft away from the actuating segments so that the same will not engage the totalizer pinions. Each member 78 is pivoted to a pair of arms 82 and 83 which are in turn fixed on the shafts 84 and 85 respectively. A pair of triangular levers 86 and 87 are loosely mounted on the shaft 85 each of these levers carrying a roller 88 projecting into cam grooves in cams 89 and 90. The shaft 84 (see Fig. 9) has an arm 91 similar to the arm 82 and also rigidly mounted thereon. Pivoted at the forward end of said arm is a member 92 adapted to be brought into engaging position with either of the levers 86 and 87. The arm 92 extends between the levers 86 and 87 (Fig. 9) and has a pair of flanges 93 and 94 (Figs. 7 and 24) one on each of its sides and oppositely positioned. Each of the levers 86 and 87 carries a roller 95 and the member 92 is arranged to be swung on its pivot 96 where it connects with the lever 91. If the member 92 is rocked so as to engage the roller on the lever 86, then when the shaft 63 rotates the cam 89 will cause the lever 86 to raise and then lower the member 92, thereby rocking the shaft 84 and operating the cam members 78. The configuration of the groove in the cam 89 is such that the totalizers will be held out of mesh during the forward movement of the segments and in mesh during the return movement of the segments, while the groove in the cam 90 is so shaped that if the member 92 is rocked to be connected to the lever 87 which engages the cam 90 the cam 90 will cause the lever 87 to move the member 92 upwardly so as to move the totalizers out of mesh after the segments have reached their extreme forward position instead of before the segments start to move as is done by the cam 89. The purpose of the mechanism which permits the moving of the totalizers out of mesh after the forward movement of the segments is to provide mechanical means for resetting the counters to zero, the forward movements of the segments serving to accomplish this if the totalizers are left in mesh with the same during such movement. In Fig. 5 the member 92 is shown with its flange 93 engaging the roller 95 of the lever 86 so that if the machine were operated with the said parts in the relation shown the totalizers would be held out of mesh during the forward stroke of the segments and held in mesh during the return stroke and by so doing causing whatever amount is set up on the keyboard to be added on the totalizers. It may be seen from (Figs. 7 and 24) that if the member 92 were rocked so as to bring the space 97 opposite the rollers 95 of the levers 86 and 87 that neither of the rollers 95 would engage the flanges 93 or 94 so that in this position the totalizers would be left in mesh during the entire forward and return stroke of the segments. When the member 92 is left in such position with the space 97 opposite the rollers 95 then when the machine is operated the totalizers will be first rotated in a backward direction until the wheels reach the zero position and then forwardly rotated back to their original positions, and so not finally effecting the totalizers at all. In such cases when the segments are in their forward positions, the machine would cause the indicators to indicate the amount of the forward movement of the segments which would correspond with the total amount added on the totalizers up to that time.

Each totalizer pinion has a pin 100 extending from the side of the tooth which would correspond with zero if the teeth on the pinion were numbered. In Fig. 5 the pin is shown abutting the top of an extension 101 on its respective transfer pawl 102. This is the zero position of the pinion and in such position it will prevent any forward movement of its respective totalizer actuating segment if the totalizer is left in mesh and the machine operated as the pin 100 could not pass the transfer pawl when the totalizer is backwardly rotated.

The position of the member 92 is controlled by keys, namely the reading key 103 and the resetting key 104. If neither of said keys is depressed the member 92 will remain in the position in which it is shown in Fig. 5 but if the resetting key 104 is depressed the member 92 will be swung rearwardly so that the flange 94 of said member will engage its respective roller 95 and cause the totalizer actuating segments to reversely rotate the totalizer pinions to their zero position. If the reading key 103 is depressed it will cause the member 92 to assume its center position when neither of the rollers will engage said member: This will cause the totalizer to be left in mesh both during the forward stroke of the totalizer actuating segments and the return of the same and cause the indicators to indicate the total amount which the totalizer has accumulated, and the printer to print the same and then the return of the totalizer to its original setting. The connecting mechanism between the reading and resetting keys and the member 92 is best shown in Figs. 2, 3, 7 and 8. It comprises the link 105 and a pair of levers 106 and 107 which are connected by another link 108. The lever 107 is rigidly secured to a shaft 109 and the reading and resetting keys are arranged to rock the said shaft and thereby cause the link 105 to be moved rearwardly. The resetting key 104 moves the link 105 rearwardly sufficiently to cause the flange 94 on member 92 to be brought into engaging position with its respective roller 95 while the reading key 103 would merely move the link 105 a sufficient distance to bring the member 92 in a position where it will not engage either of the rollers 95. The reading and resetting keys are mounted in a frame 110 (Fig. 3) and are adapted to rock said frame around its pivot 111. The reading key 103 rocks the frame 110 rearwardly while the resetting key 104 rocks the frame forwardly. A lever 112 is rigidly secured to the shaft 109 upon which the lever 107 is also rigidly mounted. The lever 112 carries a roller 113 at its forward end which roller projects into a cam slot 114 in the frame 110. If the reading key 103 is depressed the part 115 of the cam slot 114 will engage the roller 113 while if the resetting key 104 is depressed it will cause the part 116 of the cam slot 114 to engage the roller 113. As the part 116 of the cam slot 114 extends a greater distance from the pivotal center 111 of the frame 110 than does the part 115 in the cam slot it would cause the shaft 109 to be rocked a greater distance than if the part 115 of the cam slot were to engage the roller. From this construction it will be seen that if the reading key 103 is depressed the member 92 will be rocked only a distance great enough to bring the part 97 of said member opposite the rollers 95 while if the resetting key 104 is depressed it will cause said member to be rocked far enough to bring the flange 94 into engagement with its respective roller 95.

Means are provided acting between each of the totalizer actuating segments and the totalizer pinion of next lower order for causing any of the totalizer actuating segments to move an additional tooth space when the totalizer wheel of lower order has made a complete rotation so as to record said rotation on the totalizer wheel of next higher order. These means comprise the transfer pawls one of which is shown in perspective in Fig. 6ª and a side elevation of which will be found in Fig. 6. A rear view of the transfer pawls 102 is also shown in Fig. 9. The part 101 of each of the transfer pawls projects in the path of the pin 100 on the respective totalizer pinion of next lower order so that if the totalizer pinion is rotated in a forward direction far enough to cause the pin 100 to engage the projection 101 it will strike the lower side of said projection and rock the transfer pawl outwardly upon its pivot 118.

Each of the transfer pawls is provided with a laterally extending lug or bent portion 119 which normally lies in the path of a shoulder 120 (Fig. 4) of the member 42 of the totalizer actuating segment and will limit the movement of the member 42. If however, the transfer pawl is engaged by the pin 100 on the totalizer pinion the transfer pawl will be moved out of the path of the shoulder 120 and permit the member 42 to rotate an additional unit of movement until the edge 121 of the member 42 engages the projection 119. This extra unit of movement of the totalizer actuating segment will cause its respective totalizer pinion of higher order to move an additional tooth space and thereby record the completion of the rotation of the pinion of next lower order. The transfer pawls 102 are normally urged into the position in which they are shown in Fig. 5 by the springs 122. The transfer pawls are also provided with laterally extending lugs 123 which normally engage the shoulders 124 on a set of transfer pawl retaining devices 125 (Figs. 2, 5 and 6) and hold the retaining devices 125 in their lower positions as shown in the figures mentioned against the action of the springs 122 which at one end are secured to the retaining devices 125 and at the other end to the transfer pawls at 126. When a transfer pawl is moved away from the totalizer pinion through being engaged by the pin 100 the lug 123 will clear the shoulder 124 on the member 125 and permit the member 125 to spring upwardly under the action of the spring 122 so that the surface 127 of the member 125 will engage the inner face of the lug 123 on the transfer pawl and hold the pawl in its tripped position so that the transfer pawl can not accidentally move into the path of the shoulder 120 on the segment 42 before said shoulder had passed the lug 119 on the transfer pawl. The transfer pawl retaining devices 125 are triangular in shape and have mounted thereon at their lower ends rollers 129. The cams 130 which are adapted to engage the rollers 129 are rigidly mounted on the shaft 63. As the transfer pawls when tripped are always tripped on the return movement of the totalizer actuating segments, as it is during this time that the segments are ordinarily in mesh with the totalizers, it is necessary to arrange the cams 130 so as not to engage the rollers 129 and thereby release the transfer pawls from the retaining devices 125 during the return stroke of the segments. For this reason the cams 130 are cut away so that during the second half of the rotation of the shaft 63 they will be entirely clear of the rollers but the cams will engage the rollers 129 during the first half of the rotation of the shaft 63 on the next operation of the machine so as to release the transfer pawls from the retaining devices 125, if the transfer pawls had been tripped on the previous operation, and permit the transfer pawls to be again in position to be engaged by the pins 100 on their respective totalizer wheels upon the return movement of the totalizer actuating segments. Each transfer pawl is provided with a pin 132 (Fig. 2) which projects into the path of a shoulder 133 of the transfer pawl retaining device 125 so that when a retaining device 125 is engaged by the cam 130 the shoulder 133 will engage the pin 132 on the transfer pawl and thereby positively return the transfer pawl into position to be again engaged by the pin 100 on its respective totalizer pinion. This occurs just after the totalizers are disengaged from the actuating segments at the beginning of the next operation and during the two steps of idle movement imparted to all of the segments 5 before they are stopped by the zero plungers 6 as described in connection with the keyboard. This movement of the segments carries the actuating racks 42 to a position where when the transfer pawls are restored as just described the lugs 119 thereon will be brought above the shoulders 120 on the actuating racks and prevent the racks from turning in transfers unless the transfer pawls are again tripped.

*Printing mechanism.*—The type-carriers 57 (Figs. 2, 10 and 11) are pivotally mounted on a rod 58 suitably supported in the frame of the printing mechanism. These type-carriers correspond in number to the denominations which are represented in the totalizers and indicators and in the banks of clerks' and keys. Each type segment carries five type-carriers 135 and each type carrier has two type cut on its face (Figs. 10 and 11). The first one has "zero" and "one" cut on its face so if an impression were taken with the parts in the relation shown in Fig. 10 the "zero" type would print upon the detail strip.

The particular type of each of the printing segments which is brought to the printing line depends upon the extent of forward movement of its respective totalizer actuating segment 43 which is connected to the printing segment by the link 52 and rocking beam 48. When no key in any one bank has been depressed the corresponding type segment will remain in such position that the zero type is at the printing line, but if a key has been depressed the type carrying a key has been depressed the type carrying segment 57 which corresponds to the bank of keys in which the key was depressed will rock on its pivot 58 in the direction of the arrow 136 (Fig. 10) a distance corresponding to the value of such key. The rocking of the segments 57 occurs while the actuating segments 43 are momentarily at rest in their forward positions. The setting of the type segments occurs during the second third of the rotation of the drive shaft 64 as will be seen from Fig. 20. During the last third of the rotation of the shaft 64 printing hammers are caused to strike the type members 135. The shape of the printing hammers may be seen in Figs. 11, 12 and 12$^A$ and 12$^B$. The hammers are arranged so that their striking faces will clear the type members 135 so as not to interfere with the setting of the type segments. The hammers are held in position clear of the type members 135 by means of a pair of levers 137 pivoted at 138 which carry a rod 139 extending in under the part 140 of the hammers. The rod 139 is permitted to lower clear of the parts 140 of the hammers just before the hammers are to be actuated. The hammers are each connected to the frame of the printer by a spring 141. At the time of printing, the hammers are first swung backwardly on their pivot 142 so as to tension the springs 141 and are then released causing the hammers to strike the type members 135 and effect the impression upon the detail strip. By glancing at Fig. 12 it will be seen that the type hammers 143 are made in two parts 144 and 145 which are pivoted together at 146. The part 145 is intended to be swung on the pivot 146 so as to move into the path of the hammer actuating device 147 or not as desired. The parts 145 of the hammers are cammed into the path of the member 147 if the respective type carrier to such hammer is moved out of the zero position or if any type-carrier of higher order is moved out of the zero position, that is, considering the type carriers of the value keys and those of the clerks' keys as separate groups, by the camming devices 153. A camming device 153 for each of the members 145 is pivotally mounted at 148 and carries a roller 149 which lies in the path of an upwardly extending plate 150 of the type segment, so that if the type segment is rocked on its pivot 58 the part 150 will engage the roller 149 and cam the same rearwardly against the surface 151 of the member 145 of the type hammer and cause the member 145 to project below the surface 152 of the type hammer into the path of the type hammer actuating member 147. Each of the camming devices 153 of both groups of type segments has a bent flange 154 which overlaps the camming member 153 of the type segment of the next lower order. This is for the purpose of camming down such of the members 153 as are of lower order than the member 153 which is actuated by its respective type segment so as to cause the corresponding hammers of such lower cam members 153 to move into the path of the hammer actuating member 147 to effect the printing of zeros to the right of any number which is printed provided none of the lower order type segments have been set so as to print other numbers than zero. The hammer actuating device consists of a rod 147 extending across the surface 152 of all the hammers and is swung from the same pivotal center 142 as are the type hammers. The surface 152 of the type hammers is cut in a circle concentric to the pivot 142 so that the rod 147 will be free to swing without engaging any of the hammers unless their respective members 145 are lowered into its path. The rod 147 is carried by a pair of arms 156 which are pivotally connected to a pair of arms 159 which are mounted on the pivot 142. The reason for mounting the member 147 on the arms 156 instead of directly on the arms 159 is for the purpose of permitting the member 147 to be swung away from the pivotal center 142 and thereby become disengaged from the members 145 of the printing hammers and allow the hammers to be actuated by the springs 141. The member 147 engages the edge 160 of the printer frame (see Fig. 10^A) at the completion of its stroke and through such engagement is cammed rearwardly out of engagement with members 145 of the printing hammers. The member 147 is normally held against the surface 152 of the printing hammers by a spring pressed member 161. (See Figs. 10, 11 and 12^B.)

The rocking of the arms 159 is accomplished by means of cams 162 and 163 mounted upon the drive shaft 64. The cams 162 and 163 rotate in the direction of the arrow 164 Fig. 11 and operate upon a pair of rollers 165 and 166 which are mounted on a rocking frame 167 pivoted at 168. The frame 167 is connected by a link 169 to the members 159. As has been stated the members 159 are pivoted at 142 so that any upward movement of the link 169 which is pivoted to one of the levers 159 at 170 will cause the levers 159 to rock inwardly and thereby operate such of the printing hammers as are in the path of the rod 147. The cams 162 and 163 are so cut as to co-act in such a way that when the raised portion of the cam 163 engages the roller 166 the cut away portion of the cam 162 will be opposite the roller 165. It is the cam 163 which actually effects the rocking of the frame 167 on its pivot 168 and thereby causes the printing hammers to be operated. One of the members 159 has a rearwardly extending part 172 upon which is mounted a roller 173. The roller 173 extends into a cam groove 174 in one of a pair of arms 175 which carry a printing segment alining bar 176, arranged to co-act with notches cut in the plates 150 of each of the type-carrying segments. After the type carrying segments have been set so as to bring the proper type opposite the printing line the cam 163 engages the roller 166 and causes the link 169 to be moved upwardly thereby causing the roller 173 to engage the cam slot 174 in member 175 and rock said member on its pivot 177 so that the alining bar 176 will enter such of the notches 177 5 in the type-carrying segments as are opposite the bar 176 at such time. After the printing hammers have been actuated the cam 162 by engagement with the roller 165 serves to return the frame 167 and the mechanism which said frame operates to their normal position, thus returning the member 147 and the bar 176 to the positions in which they are shown in Fig. 11. The members 137 which are pivoted at 138 and which were before mentioned as carrying a rod 139 which extends in under the part 140 of all of the printing hammers so as to normally hold the hammers clear of the type members 135 carry pins 179 extending in under the parts 172 of the members 159 which parts normally bear down on pins 179 and hold the rollers 139 at the opposite ends of the levers 137 into engagement with the parts 140 of the printing hammer.

Fig. 21 illustrates the ribbon feed device for the printer. The ribbon 180 as is shown in Fig. 2 passes between the type members 135 and the platen 181 over which the detail strip 182 is fed. The ink ribbon 180 is wound upon a pair of spools 183 and 184. These spools are rigidly connected with a pair of bevel gears 185 and 186. A shaft 187 extends below the bevel gears 185 and 186 and carries a pair of bevel gears 188 and 189 and is adapted to be slid longitudinally so that either the gears 185 and 188 or the gears 186 and 189 may be meshed for the purpose of feeding the ink ribbon 180 in either direction so that when the ink ribbon is almost entirely wound upon one spool the direction of rotation of the spools may be changed and the ink ribbon re-wound on the other spool. Fig. 21 shows the ribbon feeding device just before it changes its direction of feed. The shaft 187 is intermittently rotated in one direction only. With the gear 188 meshing with the gear 185, the spool 183 will rotate in the direction of the arrow 190. If the shaft 187 is slid longitudinally so that gear 189 meshes with the gear 186 the spools would be oppositely driven. The ends of the ink ribbon are fastened to rods 191 which are mounted on arms 192 pivoted at 193 to their respective ribbon spools. The rods 191 extend through slots 194 in the ribbon spools and if the ribbon is entirely unwound from one of the spools the rod 191 will spring toward the outer end of said slot as it will naturally be urged in such direction by the ribbon 180 as it is being wound upon the other spool. As the rod 191 swings outwardly it will of course swing its respective lever 192 on its pivot 193 outwardly also. The lever 192 carries a roll 197 which when the lever 192 is swung outwardly will be brought into such position that continued rotation of its respective ribbon spool will cause the roller 197 to engage one end of a bell-crank lever 198 which is pivoted at 199 and which at its opposite end is pivotally connected to a frame 200 which carries the shaft 187. When the bell-crank lever 198 is rocked on its pivot 199 through engagement with the roller 197 it will cause the shifting of the shaft 187 so that one of the bevel gears will be disengaged from its co-acting gear and the other beveled gear will be brought into mesh with its respective gear and as the shaft 187 is always rotated in one direction, the direction of rotation of the ribbon spools will be reversed.

Rigidly mounted upon the shaft 187 (Figs. 10 and 10^A) is a gear 201 which meshes with a gear 202 which is mounted upon the shaft 168. The frame 167 which is rocked upon the shaft by means of the cams 162 and 163, as hereinafter described, carries a pawl 425 which when the frame is rocked is adapted to move into mesh with the teeth of the gear 202 and cause said gear to be slightly rotated and so cause a corresponding rotation of the shaft 187. The gear 201 is of sufficient width so that the longitudinal shifting of the shaft 187 will never disengage the gear 201 from the gear 202.

*Detail ribbon carriage.*—The detail ribbon carriage 203, Figs. 2, 13 and 14 rests upon the track 204, roller bearings 205 being between the track and the carriage. The carriage shown in the drawings has mounted thereon four rolls of detail paper. The paper is reeled off the rolls 206 (Fig. 14) onto the rolls 207. The rolls 206 and the platens 181 over which the strips of paper pass are rotatably supported by studs 2061 and 2062 respectively attached to the sides of frames 212, while the rolls 207 are supported by sleeves 208 which are mounted in the frames 212 in such a way that they are free to rotate but cannot be removed from the frames. Each sleeve 208 carries a gear 209 and these gears are arranged to mesh with a single pinion 210, located opposite the printing mechanism so as to engage only the gear 209 belonging to the particular roll which is in printing position. (See Fig. 1). A rod 211 which is cut away at the location of the pinion 210 extends along the entire path of movement of the paper carriage and engages teeth of all of the gears 209 except the one which is in mesh with the pinion 210 and prevents accidental rotation of such other gears. There are of course four of the frames 212 one for each record strip. These frames are provided with notches 2063 (Fig. 14) engaging a rod 2064 extending from one side to the other of the traveling frame. At their lower ends the frames 212 have suitably shaped portions resting in recesses 2065 formed in lugs 2066 extending up from the cross bar of the frame 203. The frames 212 are all normally held against removal by a rod 212 which passes through holes in the sides of the frame 203 and through all of the sleeves 208. This rod is provided at one of its ends with a knurled button 214 (Fig. 13) by means of which the rod may be withdrawn when it is desired to remove a frame for any purpose, as, for example, to replenish the supply of paper. The frame 203 has rigidly secured thereto a nut 215 which encircles and meshes with a spiral shaft 216, arranged to be differentially rotated by the operating mechanism so as to bring different rolls of detail paper opposite the printing mechanism into printing position.

The mechanism for rotating the spiral shaft 216 is controlled by a lever 217 (Fig. 15^A) which will be called the classification lever as it determines which of the rolls of detail paper will be brought to printing position, these rolls containing the records of different classes of transactions. The lever 217 is adapted to be shifted into four positions as shown by dotted lines in Fig. 15^A, and is pivotally mounted on the frame at 218 and carries a pin 219 which extends between a pair of bell crank levers 220 and 221 which are also mounted on the shaft 218. The lower ends of the levers 220 and 221 are connected by a spring 222 which tends to urge the levers 220 and 221 into the position in which they are shown in Fig. 15^A, the levers being prevented from going beyond the position in which they are shown, under the action of the spring 222, by the pin 223 which extends from the side frame of the machine. The levers 220 and 221 cross each other at their pivot 218 as do the two cutting members of a pair of shears. If the lever 217 is shifted from one side or the other from the position in which it is shown in Fig. 15A, the pin 219 which it carries will engage one of the bell crank levers and cause the tensioning of the spring 222, the remaining bell crank lever being prevented from following the first under the action of the spring 222 by the pin 223 extending from the frame of the machine. With this arrangement the spring 222 when tensioned through the shifting of the lever 217 will upon the releasing of the lever 217 from its shifted position cause the return of the lever to its original position through rocking one of the bell crank levers on its pivot 218, the upper part of the lever engaging the pin 219 and thereby returning the lever 217 to its original position.

The lever 217 is connected by a link 225 to the lever 226 (Fig. 15), pivotally connected to a link 225 at 227. The lever 217 has pivoted thereto one end of a link 225 the other end of the link being pivotally connected at 227 to the upper end of a lever 226. The link 228 connects the lever 226 to a rocking segment gear 230 which is pivoted at 248, and which meshes with a gear 231 rigidly mounted on a shaft 232. The shaft 232 carries a gear 233 which meshes with a gear 234, rigidly fastened on the spiral shaft 216. The lever 226 is arranged so that it will rock on its pivot 229 when the classification lever 217 is shifted. The link 225 is pivoted at 235 to a lever 236 which is pivoted to the frame of the machine at 237 and has cut in its lower end a series of locking notches 238 which notches co-act with a locking device 239. When the classification lever 217 is shifted it will rock the lever 236 a corresponding distance and the locking device 239 will then engage one of the notches 238 and hold the lever 236 in its moved position. The locking device 239 is urged into engagement with the notches of the member 236 by the spring 240, and is locked in such position while the drive shaft 64 is rotating by a segment 241 which rotates with the shaft 64 and moves in front of an extension 242 of the locking device 239 and prevents said device from rocking on its pivot. An arm 243 is pivoted to the center of the lever 226 and extends over the shaft 64 and carries a pair of rollers 244 and 245 which are located at each side of the shaft 64. The shaft 64 carries a pair of cams 247 one on each side of the arm 243. When the shaft 64 is rotated, one or the other of the rollers 244 and 245 will be engaged by its cam 247 if the lever 226 has been rocked on its pivot 229 so as to bring one of said rollers into the path of its respective cam.

When the classification lever 217 is shifted so as to bring one of the rollers 244 or 245 into the path of its respective cam the lever 226 will when the shaft 64 is rotated be prevented from rocking on its pivot 229 by means of lever 236 and co-acting locking device 239, the engagement of one of the cams 247 with its respective roller will cause the lever 226 to be rocked on its pivot 227 a distance corresponding to that which its opposite end was rocked through the shifting of the classification lever 217. When the lever 226 is rocked on its pivot 227, it forces the segment gear 230 to rotate the gear 231 an amount which exactly corresponds to that which the lever 226 is rocked. Rotation of the gear 231 will cause rotation of the gear 234 and of the spiral shaft 216 to which the gear 234 is rigidly secured. Rotation of the spiral shaft 216 will cause the detail tape carriage 203 to be moved to the right or left according to the direction and extent of rotation of the spiral gear 216 which direction or extent of rotation is determined by the setting of the classification lever. At the completion of the rotation of the shaft 64 after one of the cams 247 has engaged one of the rollers 244 or 245 and caused the shifting of the detail tape carriage to the desired extent, the roller 250 carried by one of the cams 247 will engage an extension 251 of the locking device 239 and disengage said device from the lever 236. This will permit the lever 226 to again rock on its pivot 229 back to normal position, the position in which it is shown in Fig. 15. The lever 226 is rocked back to its normal position by the spring 222 of the classification lever (Fig. 8) which when the locking device 239 is disengaged from the lever 236 will be free to return the classification lever 217 to its normal position and through it cause the connecting link 225 to return the lever 226 to normal position. When the lever 226 is returned to normal position it will carry with it the member 243 again bringing one of the rollers 244 or 245 into the path of its respective cam a distance equal to that in which the remaining roll had been brought into the path of its respective cam when the lever 226 was rocked out of its normal position. Upon the next operation of the machine, provided the transaction lever 217 is left in its normal position, the cam 247 which engages the roller 244 or 245 which has been brought into its path through the return of the lever 226, will cause the particular detail strip which was moved out of the printing position during the previous operation to be returned to the printing position.

The segment gear 230 which transmits motion to the detail tape carriage also effects the bringing of different totalizers into mesh with the actuating mechanism by means of the link 255 which is pivoted to an arm 256 of the segment 230. The connection between the link 255 and the totalizer will be later described but is mentioned here because the mechanism used for bringing different detail strips to the printing line is also used for bringing corresponding different totalizers into position to be engaged by the totalizer actuating mechanism.

Rotation of the pinion 210 (Fig. 14) which causes the feed of the detail strip which is in printing position is effected by the toothed disk 257 which is rotated by means of a pitman 258 mounted upon an eccentric 259 on the drive shaft 64. The pitman is pivoted at 260 to the frame of the machine midway between drive shaft 64 and the shaft 261 upon which the toothed disk 257 is mounted so that the reciprocating motion which it receives from the eccentric 259 will be converted into rotating motion causing the rotation of the shaft 261. Each rotation of the shaft 261 will cause the gear 209 which rotates the roll of detail paper to be fed one tooth space. The star shaped disk 262 on the shaft 263 and the notched disk 264 on the shaft 261 are similar to a Geneva stop and co-act so as to prevent rotation of the shaft 263 except when the teeth of the disk 257 engage the teeth of the gear 265.

Each of the frames 212 which carry the rolls of detail paper has also mounted thereon a small grooved wheel 266. (See Fig. 13). The grooved wheels co-act with an alining device 267 mounted near the printer so that when the alining device 267 is rocked from the shaft 268, as shown in Fig. 14, the alining device 267 will enter the groove of the roller 266 of the frame carrying the detail strip which is brought to the printing position and center the same in such position as to insure the meshing of the gears 209 and 210 and also to aline the detail strip with the printing mechanism. The alining device 267 has a rearwardly extending part 269 to which is pivoted a link 270, the opposite end of which is pivoted to a bell crank lever 271. The bell crank lever 271 is pivoted at 272 and one arm of the bell crank lever carries a roller 273 which roller is in position to be engaged by a cam 274 rigidly mounted on the drive shaft 64. The cam is so arranged upon the drive shaft that it will engage the roller 273 and cause the alining device 267 to enter the groove of the roller 266, after the desired detail strip has been brought to printing position.

*Indicator mechanism.* — The indicator drums 55 are all mounted on the shaft 276 (see Figs. 1 and 16). As there are four banks of value keys, each of said banks is represented by two indicator drums one of which is arranged to be read from the front of the machine and the other of which is arranged to be read from the rear of the machine. It may here be stated that each totalizer comprises six pinions so as to represent six denominations, while in the key board only four denominations are represented by the value keys. This difference in numbers between the denominations represented by the totalizer and those represented by the value keys while only permitting amounts of four denominations to be added to the totalizer at any one operation of the machine allows for the totalizer accumulating a total number of six denominations. For this reason two extra indicator drums are provided with the set which reads from the front of the machine so as to indicate to the operator the totals which have been accumulated on the counter when the machine is operated to indicate totals. The two sets of indicators which indicate individual amounts added to the totalizer are connected together through their actuating segments 53 by nested yokes or bars 278, indicators of like denomination being connected. The segments 53 are caused to rotate the indicator drums to the desired amount by means of the links 52 and connections which were described in connection with the totalizer actuating segments. The indicator alining pawls 59 are rocked into and out of mesh with the disks 67 which are rigid with the indicator drums at the proper time by a cam 279 which is mounted upon the shaft 64, and which engages the roller 280 mounted upon a pivoted lever 281 (shown in Fig. 16). The lever 281 is linked to an arm 282 by a link 283. The arm 282 is rigidly secured to the shaft 284 upon which all of the alining pawls 59 are also rigidly mounted. At the beginning of an operation of the machine before the indicators are set the cam 279 will engage the roller 280 thus rocking the lever 281 downwardly against the action of a spring 286 and causing the alining pawls 59 to be moved out of engagement with their respective disks and held out of engagement until the indicators are set, when the cut away portion of the cam 279 comes opposite the roller 280 and allows the lever 281 to return to its normal position under the action of a spring 286 and so return the alining pawls 59 into engagement with the disks 67.

The flash mechanism Fig. 16 which is intended to cover the exposed part of the indicators when they are being rotated consists of a pair of shields 287 and 288 which are mounted on arms 289 and 290 loosely journaled on the shaft 276. The arm 289 is directly connected to the link 291 by a link 292 while the arm 290 is connected to the link 291 by a link 293 and an intermediate bell-crank lever 294, which is pivoted to the frame of the machine at 295. With this construction, if the link 291 is lowered it will by means of the connecting link 292 cause the lowering of the screen 287 while by means of the bell-crank lever 294 and the link 293 it will also cause the lowering of the screen 288. The link 291 is operated at the proper time by the cam groove 296 which is cut in a disk 297 mounted upon the drive shaft 64 and engages the roller 298 extending from the link 291.

*Motor key and connecting mechanism.—* The motor key 300 Figs. 1 and 18 controls the closing of the motor switch 301. The motor is not shown in the drawing but will cause one rotation of the drive shaft 64 every time the switch 301 is closed, the motor itself causing the opening of said switch after the shaft 64 has been rotated. The motor clutch is shown in Fig. 18. The clutch member 302 is connected by a spring 303 to a disk 304. The disk 304 may rotate for a limited distance under the action of the spring 303 in the direction of the arrow 305 but is normally prevented from doing so by an arm 306 which is pivoted at 307 and engages a lug 308 on the disk 304. If the arm 306 is withdrawn from the disk 304, the disk will rotate and engage a roller 309 which is mounted upon a bell-crank lever 310 and will rock the bell-crank lever on its pivot 311 causing the end 312 of the bell-crank lever to bear down upon a roller 313 mounted upon a switch arm 314 and cause the closing of the switch. The motor will then be set in motion causing the drive shaft 64 to make one complete revolution. When the drive shaft 64 has made a complete revolution a roller 315 mounted upon a gear 316 will engage a member 317 which is pivotally connected to the arm 306 at 319 above the pivotal center 307 of said arm so that when the arm 317 is engaged by the roller 315 of the gear 316 it will cause the arm 306 to be rocked into the path of the lug 308 on the disk 304 thus preventing the disk from further rotation.

The motor causes the clutch member 302 to rotate enough after the disk 304 has been stopped to again bring the spring 303 under tension ready for the next operation of the machine. A spring 320 which is wound upon the shaft 307 tends normally to urge the arm 306 out of engaging position with the disk 304 but is prevented from doing so both by a stop controlled by the motor key and a stop controlled by the clerks' keys. The stop 321 which is operated by the motor key 300 resembles a bell-crank lever and is pivoted at 322 to the machine frame. It normally lies in the path of a pin 323 but is moved out of the path of the pin 323 by depression of the motor key 300. The pin 323 is mounted on a lever 324 which is rigidly secured to a shaft 325 which in turn carries a lever 326 which is connected by a link 327 to an extension 328 of the arm 306. From the construction so far described if the motor key is depressed so as to rock the member 321 on its pivot 322 out of the path of the pin 323, the spring 320 would be free to rock the member 306 out of engagement with the disk 304 but it is desirable that this shall not occur unless at least one of the clerks' keys has been depressed. For this reason a stop controlled by the clerks' keys is provided which if none of the clerks' keys are depressed will prevent the spring 320 from rocking the arm 306. This stop is in the form of a hook 330 (see Fig. 19) which normally hooks over a pin 331 mounted upon a link 332 which link is pivoted to a lever 334 rigidly mounted upon the shaft 325 (see Fig. 18). As the spring 320 in rocking the arm 306 would also have to rock the shaft 325 the spring would be prevented from operation if the hook 330 engages the pin 331 on the link 332. Each bank of clerks' keys is provided with a parallel motion device 13 as was described in connection with the keyboard and as illustrated in Fig. 3. Fig. 19 shows the parallel motion device as used in connection with the clerks' keys. The lower lever 10 of this device of each of the banks of clerks' keys carries a forked member 336 to which it is pivoted at 337. The forked end of the lever engages a pin 338 mounted on one end of a bell-crank lever 339, which is rigidly mounted on a shaft 340 upon which the hook 330 is also rigidly mounted. If the parallel motion device is rocked inwardly through being engaged by one of the pins 14 of the key plungers of the clerks' keys, the lever 10 will be rocked on its pivot 12 forcing the forked member 336 downwardly so as to rock the bell-crank lever 339, the shaft 340, and the hook 330, and the member or link 332 will no longer prevent the operation of the spring 320 and the consequent closure of the motor switch, as the hook 330 will be moved out of engagement with the pin 331 which is mounted on the link 332 and permit the link to move up when the shaft 325 is rocked. This construction permits the depression of the clerks' keys and motor key in any order or simultaneously but the motor switch will not be closed until both one of the clerks' keys and the motor key have been depressed.

A lever 380 (Fig. 18) which is rigidly mounted on the shaft 325 and which will rock therewith is connected by a link 381 to a bell-crank lever 382 pivoted at 383 to the frame of the machine. The bell-crank lever 382 carries a pin 384 which when the lever is rocked will enter one of the slots 385 in a locking device or segment 386 which is mounted on the shaft 218 and upon which shaft the classification lever 217 is also mounted. The locking device 386 is secured to the classification lever at 387 and will be rocked upon the shaft 218 with the classification lever whenever the same is shifted to any of its four different positions, thus bringing one of the notches 385 into position to be engaged by the pin 384 upon the bell-crank lever 382 when the lever 382 is rocked upon its pivot 383. The bell-crank lever 382 will be rocked upon its pivot 383 and cause the pin 384 to enter one of the notches 385 and lock the classification lever in any of its set positions whenever the locking member 306 is disengaged from the clutch disk 304 as the disengagement of the member 306 from the disk 304 will cause the shaft 325 to be rocked which will in turn effect the rocking of the bell-crank 382 as explained. The above described locking device for the classification lever 217 is provided so that the classification lever may not be shifted after the motor is started and cause a misoperation of the machine, and so that the classification lever 217 must be exactly in one of its four positions and not in some intermediate position when the machine is operated. When the member 306 is again engaged with the clutch disk 304 after the machine has been operated the bell-crank 382 will be rocked on its pivot 383 so that the pin 384 will move out of engagement with the member 386, being aided by a spring 388.

After an operation of the machine the motor key 300 is returned to normal position by a spring 389 which is stretched from the frame of the machine to one end of the bell-crank lever 390 to which the motor key is pivoted. The bell-crank lever 390 is pivoted to the frame of the machine at 391 and is connected to the other bell-crank lever 321 to which the motor key is also pivoted by a link 392, so that the motor key 300 will move downward uniformly no matter at what point along its length pressure is applied to the key.

It may be noted that when motor key 300 is depressed and the arm 324 rises, the pin 323 will pass in front of lever 321 and hold the motor key depressed until stop 306 is forced back to locking position.

A pawl 393 (Fig. 18) which is pivoted at 394 to the bell-crank lever 321 co-acts with the pin 323 and bell-crank 321 so that if the motor key is held in its depressed position during an operation of the machine, so as to prevent its return to normal position at the time the clutch stop 306 is again engaged with the disk 304, the pawl 393 through engagement with the pin 323 will serve to prevent the disengagement of the clutch member 306 while the motor key is held depressed. When the motor key 300 is depressed the bell-crank 321 will swing upon its pivot 322 so that the part 397 of the pawl 393 will be engaged by the pin 323 when lever 324 moves up and the pawl will be rocked on its pivot 394 against the compression spring 395 so that the pin 323 will enter the space between the part 397 of the pawl 393 and the bell-crank lever 321. If the motor key is not held in its depressed position, upon the completion of an operation of the machine, the pin 323 will be moved away from between the bell-crank 321 and the pawl 393, the bell-crank 321 being then rocked by the spring 389 so as to engage the pin 323 and prevent the spring 320 from disengaging the member 306 from the disk 304 as explained. If, however, the motor key is held in its depressed position when the pin 323 moves out from between the bell-crank lever 321 and the pawl 393, the pawl 393 will be rocked by its spring 395 so that the depending end 397 of the pawl will come into the path of the pin 323 and prevent the return of the same and the consequent closing of the motor switch. When the motor key is released the pin 323 will ride off of the end of the pawl 393 into engaging position with the bell-crank 321 as shown in Fig. 18 which is the necessary position of the parts before the machine may be operated.

Without the above mechanism an operator could, by holding the motor key depressed, after he had once operated the machine by depressing the motor key in combination with one of the clerks' keys, again operate the machine without depressing one of the clerks' keys and so fail to record his number with the particular transaction.

Means are provided whereby when a reading is taken or the totalizers reset to zero it will not be necessary to depress one of the clerks' keys before the machine is operated so that in taking a reading, or resetting the totalizers all that will be necessary to operate the machine is to depress either the reading or resetting key and the motor key. For this reason the reading and resetting keys are provided with means for rocking the hook 330 out of engagement with the pin 331 when either of said keys is depressed. It has been explained in connection with the keyboard mechanism how the shaft 109 will be rocked upon depression of either the reading or the resetting key. (See Figs. 3, 17 and 19). The shaft 109 has rigidly secured thereto a cam member 341 (Fig. 19) which engages a roller 342 mounted on one arm of the bell-crank lever 339 so that the rocking of the shaft 109 also causes the rocking of the bell-crank lever 339, the shaft 340, and the hook 330 rigid with the shaft so as to disengage the hook 330 from the pin 331, the same as would occur if one of the clerks' keys were depressed.

Means are provided for preventing the depression of either the reading or resetting keys if any of the amounts keys are depressed so that the operator can not cause a reading or a resetting and at the same time add an amount to one of the totalizers.

These means are illustrated in Fig. 3 and consists of a lever 343 which is arranged to rock upon the shaft 344 and will do so if any of the amount keys are depressed as the parallel motion device 13 rocks lever 10 on its pivot 12 and causes a forked member 345 connected to lever 10 and engaging the pin 346 mounted on the lever 343 to swing the lever 343 downwardly on its pivot. When the lever 343 is swung downwardly it will come into the path of a pin 347 mounted on the lever 112, the rocking of which lever by means of the reading or resetting keys was described in connection with the description of the keyboard. It will also be clear that if the reading or resetting key is actuated pin 347 moves up into the path of the lever 343, thereby preventing operation of any amount key.

Means are also provided for preventing the depression of either the reading or resetting key when the indicators are not all at zero positions. An idle operation of the machine, that is an operation of the machine without depressing any of the value keys so as to add an amount to the totalizer, will bring the indicators to zero position as in such an operation they would naturally indicate that nothing had been added to the totalizers. The reason for preventing the depression of either the reading or resetting key without first giving the machine an idle operation is to make sure that none of the transfer pawls are in their tripped positions as in such positions a reading or resetting would result in a wrong amount being printed.

With this end in view the pivotal connections 56 between the links 52 and type segments 57 (Fig. 17) extend a trifle beyond the sides of the links 52 and there engage levers 350. The levers 350 are all rigidly mounted upon a shaft 351 which has a lever 352 rigidly secured thereto which lever is urged to rock the shaft 351 by a tension spring 353 but will be prevented from doing so if any of the pins 56 are in position to engage the surface 354 of the levers 350. Fig. 17 illustrates the pin 56 in relation to the lever 350 as such relation would be if corresponding indicator were at zero position. If the link 52 were drawn downwardly out of the zero position the pin 56 would engage the member 350 and cam it rearwardly so as to rock the shaft 351. The shaft 351 has a lever 355 rigidly mounted thereon which is connected by a link 356 to a pivoted arm 357. The arm 357 is pivoted at 358 and is connected by a spring 359 with an arm 360 which is also pivoted at 358. If any of the indicators are not in the zero position one at least of the pins 56 will be in engagement with the surface 354 of one of the levers 350 which would be rocked slightly backward from the position in which it is shown in Fig. 17 causing the shaft 351 to be rocked on its axis a distance far enough to cause the lever 360, which is connected to the shaft 351 by the link 356 and the lever 355, to rock into position before the pin 347 and so prevent depression of either the reading or resetting keys. The reason that the link 356 is connected to the lever 360 through the lever 357 and spring 359 instead of directly to the lever 360 is to permit movement of the links 52 after the reading or resetting key has been depressed as the links 52 must, of course, be free to operate the printing mechanism and indicators when a reading or resetting is taken, at which time the pin 347 has been raised into the path of lever 360. If it were not for this spring connection 359, and if the pin 347 were moved up at the side of the lever 360 as would occur when either the reading or resetting key is depressed then the levers 350 would be prevented from being rocked backwardly by the pins 56 because of the rigid connection between the lever 350 and the lever 360.

*Arrangement of multiple totalizers.*—In describing the totalizer mechanism it was referred to as a single totalizer of six denominations, for the sake of simplifying that part of the description, but the drawings show four such totalizers. The totalizers are all mounted upon the shaft 80 (Figs. 5 and 9). This shaft is arranged to slide longitudinally so as to bring the different totalizers into mesh with the actuating mechanism at the same time that the detail tape carriage is shifted so as to bring different rolls of detail paper into printing position. The totalizers and detail tape carriage are shifted by the mechanism previously described and shown in Figs. 15 and 15ª. The link 255 (see Figs. 15 and 5) which transmits movement from the segment gear 230 to the totalizer shaft 80 connects the segment gear 230 to a bell crank lever 362 which lever is pivoted to the frame of the machine at 363 and is forked over a small rod 364 which is rigid with a frame 365 in which the totalizer shaft 80 is journaled. By this means the differential longitudinal movement of the shaft 80 is obtained from the differential rocking of the segment gear 230. The totalizers are shifted while the actuating racks are being moved forwardly when the totalizers are out of mesh having been moved out of mesh by the cam member 78. As has been explained after the desired totalizer has been brought opposite the actuating racks and while the segments are at rest in their forward positions the totalizers are again cammed into mesh with the segments by the cam 78. As the totalizers are moved into mesh with the segments an alining plunger 366, movable with the totalizer frame 365, will enter one of the borings 367 in a part 368 (Fig. 9) which is rigid on one of the tie rods supporting the frames of the machine and cause the totalizer pinions to properly mesh with the actuating segments. The pinions of the four different totalizers are arranged in denominational groups. For instance, all of the units pinions 369 are mounted side by side also the tens and so on through all of the denominations represented in the totalizers. With the totalizers so arranged, different totalizers may be brought into mesh with the actuating segments by shifting the totalizer shaft 80 in a longitudinal direction the distance occupied by one denominational group of all of the totalizers or less than that distance, depending upon which totalizers are brought into mesh with the actuating racks and the particular position which the totalizers are in before being shifted.

When the frame 365 in which the totalizer shaft 80 is journaled, is moved away from the totalizer actuating segments, a totalizer pinion alining and locking device 412 (Figs. 5 and 6) will enter between teeth of all of the totalizer pinions and prevent accidental rotation of the same when they are in such position. The alining device 412 is hung from a shaft 413, which is journaled in the frame 365 by a pair of arms 414 which arms are urged by springs 415 (Fig. 9) to rock toward the totalizer pinions so that the alining device will engage the same. The alining device is held out of engagement with the pinions when the pinions are in mesh with the actuating segments by the cam arm 78 which engages a tie-rod 416 connecting the two arms 414 but which when moved upwardly for the purpose of shifting the totalizer pinions out of mesh with the actuating segment allows the alining device to follow under the action of its springs so that the alining device will begin to engage the pinions before the pinions are moved entirely out of mesh with the actuating segments.

A toothed member 417 which is rigidly secured to the frame at 418 extends across all of the totalizer pinions and engages those which are not meshed with the segments but is cut away at equal distances along its length to allow the passage of each of the actuating segments and so as not to interfere with the rotation of the totalizer with which the segments are meshed. The object of the toothed member 417 is to prevent the accidental rotation of the totalizers which are not in engagement with the actuating segments when the totalizers are out of engagement with the alining device 412 and one set of the same are in engagement with the actuating segments.

The alining device 412 and the toothed member 417 together will lock all of the totalizer pinions against rotation at all times except those which are actually in mesh with the actuating segments.

A multiple totalizer construction which is identical in some respects to the one here described is described and claimed in a copending application of C. F. Kettering, Serial No. 376,830.

It has been explained that for reading or resetting, the totalizers are meshed with their actuating segments during the forward stroke of said segments. In view of the fact that it is at this part of the operation that the lateral shift of the totalizers takes place, it will be evident that the totalizers cannot be shifted and a reading of the totalizer shifted into operative position taken, at one operation of the register. This being the case, if it is desired to have a reading from any particular totalizer other than the one which would mesh with the actuating segments if the lever 217 were not shifted, it would be first necessary before the depression of the reading or resetting keys to shift the lever 217 to the desired position and then give the machine an idle operation so as to bring the desired set of totalizer pinions into mesh with the actuating racks. Then as the lever 217 would be automatically returned to its normal position, it is necessary to turn the lever 217 again into the position into which it was first shifted so that when the reading or resetting takes place the totalizer which normally meshes with the actuating segments will not be returned into mesh with the actuating segments, but the totalizer from which it is desired to take a reading or resetting will remain in mesh. The reading or resetting key may now be depressed and the machine operated to either indicate the total amount of the particular totalizer meshed with the actuating segments or to indicate such amount and reset the said totalizer to zero. However, as an idle operation must be given to reset the transfer pawls, this idle operation may also be used to accomplish the lateral shift referred to.

The lever 226 which is rocked by the transaction lever 217 carries a pin 370 at its connection with the arm 243 (see Figs. 15 and 17) which pin serves to cam a bell crank lever 371 downwardly so as to rock a lever 372 out of the path of the pin 347 carried by the arm 112, whenever the position of the transaction lever 217 coincides with the particular totalizer which normally meshes with the totalizer actuating racks, while if the transaction lever 217 were in such position that when the machine is operated a different set of totalizer elements would be brought into operative relation with the actuating segments, the pin 370 would be moved out of engagement with the bell-crank lever 371 which would then be rocked by its spring 373 so as to rock the lever 372 into the path of the pin 347 and so prevent depression of either the reading or resetting keys. This construction makes it necessary for the operator to give the machine an idle operation and properly position the transaction lever 217 before he can depress either the reading or resetting key. If it is desired to take a reading or reset the totalizer which normally meshes with the actuating racks it will not be necessary to shift the transaction lever 217 at all, but merely to give the machine an idle operation to cause the return of any of the transfer pawls which may be in their tripped position. This was explained in connection with the description of the indicator mechanism.

It will be understood that during every operation the pin 370 is returned to a constant position by rollers 245 or 244, the positioning of the proper totalizer depending on the angular position given lever 226. Consequently if two operations in succession are given to any one totalizer the pin 370 is moved at the second operation to exactly the position previously occupied by it through the manual adjustment of transaction lever 217. Therefore at such second operation the pin 370 will be moved by lever 217 over lever 371 as shown in Fig. 17 and the reading and resetting key may then be depressed.

The classification lever 217 has pivoted thereto at 405 a dog 406 which is connected to a spring pressed rod 407 which normally urges the dog into the position in which it is shown in Fig. 15ª. With the dog 406 in this position if the classification lever 217 is moved toward the left, as it is shown in Fig. 15ª, the dog 406 will engage a pin 408 which is rigidly mounted upon the frame of the machine, before the classification lever can be moved into its extreme left hand position as indicated by the dotted lines in Fig. 15ª, although it may be freely moved to any of its other three positions. In order to shift the transaction lever to its extreme left hand position the knob 409 on the rod 407 must be depressed so that the dog 406 will be rocked on its pivot 405, so that it will not engage the pin 408 when the lever is shifted to its left hand position. This requires the operator to specially operate the transaction lever 217 in order to cause one particular totalizer to be brought into operative position.

The totalizer referred to may be one which is used to keep account of amounts which are paid out or of money which is refunded. For this reason if an operator intended to record a sale and he failed to shift the classification-lever so that the sale would be recorded upon the totalizer which records sales of that particular class, he at least could not shift the classification lever so that the totalizer which kept a record of the money which is paid out would be brought into operative position with the actuating mechanism, without a special operation of the classification-lever, as recording the amount received upon the paid out totalizer would be a much more serious error than to record said amount upon one of the totalizers which kept account of sales of a different class.

The operation of the machine is as follows: The operator will depress the value keys which represent the amount he desires to add to the totalizer and those of the keys 400 which designate his own number and will also shift the transaction lever 217 so that when the machine is operated the desired totalizer will be brought into operative engagement with the actuating segments. He will also depress the motor key 300. The order in which the clerks' keys 400 and the motor key are depressed is immaterial.

The motor is directly geared to the shafts 64 and 63 and causes said shafts to make one revolution in the direction indicated by the arrows in Fig. 2. Immediately upon the starting of the shaft 63 the camming member 78 will be cammed upwardly by the cams 89 so that the totalizers will be moved away from the totalizer actuating segments. After the totalizers have been moved out of mesh with the totalizer actuating segments the arms 73 which carry the rod 71 extending across the parts 43 of all the segments will be rocked upwardly so that the segments will be free to follow under the action of their springs 60. As the depression of any of the value keys will cause the withdrawal of the zero plunger of the respective banks of such keys and also cause the particular plungers to which the keys are connected to project into the paths of the respective totalizer actuating segments which they control, the totalizer actuating segments will be stopped at such plungers as are moved into their paths. Of course, if no value key is depressed in any of the banks of value keys the zero plungers of such bank or banks will not be withdrawn from the path of their respective totalizer actuating segments and will prevent said segments from moving farther than their zero positions.

When the totalizer actuating segments abut the plungers which are moved into their paths the cams 625, Fig. 4, will cause the totalizer segment alining bar 61 to rock into engagement with the teeth 62 of the actuating segments and lock the segments in their moved position. By the time the alining bar 61 engages the teeth 62, the drive shaft 64 will have rotated far enough so that the teeth of the mutilated gear on the shaft 64 (Fig. 20) will have engaged the teeth of the mutilated gear mounted on the shaft 41 so that the shaft 41 will now make a complete rotation in the direction indicated by the arrow in Fig. 4. As the forward movement of the actuating segments will have rocked their beams 48 on their pivots 51 distances corresponding to the extent of forward movement of the actuating segments, the rotation of the shaft 41 will cause the cams 68 to engage such of the rollers 69 of the beams 48 as may have been brought into their paths and rock the beams 48 on their pivots 50 so that the opposite end of the beams will be rocked distances equal to the distances which the ends 50 of the beams had been rocked by the forward movement of the segments. The rocking of the ends 48 of the beams 51 will cause the links 52 to position the type carriers 57 of the printing device and the indicators to correspond to the amounts of the value keys which were depressed in their respective banks of value keys. It is while the indicators are being set that the cam 279 on the shaft 64 (see Fig. 16) will cause the flash mechanism to be operated so that the screens 287 and 288 will cover the exposed parts of the indicators while the same are being rotated.

While the totalizer actuating segments were being moved forwardly the mechanism, illustrated in Fig. 15 will be operated so that the desired set of totalizer elements is brought into alinement with the actuating racks and the corresponding detail strip is brought to the printing position. This mechanism has been fully described in detail so it will not again be described here, but it may again be stated that it will so shift the totalizer shaft and the carriage of detail strips that the desired totalizer and detail strip will be directly brought to operative positions regardless of which direction the totalizers or carriage of detail strips should be shifted in order to bring the desired totalizer and detail strip into operative relation with the totalizer actuating segments and the printing mechanism respectively. After the desired totalizer has been brought into alinement with the totalizer actuating racks and the corresponding detail strip has been brought to the printing position the cam member 78 will be lowered so that the totalizer which has been brought into alinement with the totalizer actuating segments will be meshed with the same. The cam groove in the cam disk 89 is cut so as to cause the member 78 to be lowered at this time when the totalizer actuating segments are locked in their forward positions. After the desired totalizer has been meshed with the actuating segments the alining device 61 will be moved out of engagement with the notches 62 in the actuating segments. The cam 72 (see Fig. 2) will now operate on the pitman 74 so that the arms 73 will be rocked downwardly back to their original positions this causing the rod 71 which is carried by the arms 73 to return all of the actuating segments which have been moved out of their normal positions back to normal position which position is shown in Fig. 2. As one of the totalizers was brought into mesh with the actuating segments when they were in their forward positions, the particular totalizer will be rotated upon the return movement of the segments a distance corresponding to their forward movement which distance is regulated by the particular value keys depressed, thus causing the amount of the value keys which were depressed to be recorded on the totalizer. Just before the shaft 64 comes to rest at the completion of an operation, the cam 163 which is carried by the shaft 64 (see Fig. 11) will engage a roller 166 which causes the rocking of the frame 167 so that the link 169 which is pivoted to said frame will operate the printing hammers, so that an impression will be taken from the type which have been brought to the printing position.

If it is desired to learn the total amount which has been accumulated on any of the totalizers the operator will position the classification lever 217 so that when the machine is operated the desired totalizer will be brought into alinement with the actuating segments. He will then operate the machine causing the particular totalizer to be shifted into alinement with the actuating segments which operation will also return all of the indicators to zero and also reset any of the totalizer transfer pawls which have been tripped. This operation of the machine causes the classification lever 217 to return to its normal position, but the operator will move the classification lever 217 back to the position into which he first shifted it and will then press the reading key 103. This will cause the totalizers to be held in mesh both during the forward movement of the totalizer actuating segments and the return of the same upon the operation of the machine. This was explained in connection with the detailed description of the reading key. The depression of the reading key 103 will cause the lug 401 upon said key to move out of the path of the pin 402 which is mounted on the bell crank lever 40. The bell crank lever 40 (see Fig. 17) will then be rocked by the spring 403 and connecting lever 39 into the notch 404 of the frame of the reading and resetting keys and retain the reading key in its depressed position. As the bell crank lever 40 is rigidly mounted on the shaft 18, the shaft 18 will rock with the bell crank lever and will carry the levers 21 which are rigidly mounted upon the shaft 18 so that the rod 20 which is carried by the levers 21 will engage all of the levers 17 of the banks of value keys and rock the same downwardly. The zero plungers are pivoted to the levers 17 and will be withdrawn from the paths of their respective totalizer actuating segments when the levers 17 are rocked upon the shaft 18. With the zero plungers withdrawn all of the counter actuating segments will be free to be rocked forwardly until the same are stopped by the pins 100 of their respective totalizer pinions (see Fig. 5) which pins will engage the tops of the pawls 102 when the pinions have reached their zero positions. By this means in reading operations the totalizer actuating segments are rocked in a forward direction an amount corresponding to that which the totalizers were previously rotated in a forward direction. The actuating segments will then be locked in their forward position by the alining device 61 the same as in any ordinary operation of the machine when amounts are being added to the totalizer, also the cams 68 will be rotated when the segments are locked in their forward positions causing the amount of their forward movement to be set up on the indicators which amount of course corresponds with the total amount of particular totalizer which is in mesh with the actuating segments. Then, as in other operations of the machine the segments will be returned to their initial positions, the totalizer element remaining in mesh during the return so as to again be forwardly rotated from their zero position to that in which they were set before the reading operation.

In a resetting operation the machine is operated exactly the same as for taking a reading except that the resetting key 104 is depressed instead of the reading key 103. Depression of the resetting key 104 merely regulates the action of the totalizer shifting cam 78 so that the cam will cause the totalizer to be disengaged from the actuating segments when the segments are rocked to their forward positions, thus leaving the totalizer at its zero position. The total amount added to the totalizer is printed on its corresponding detail strip in both the reading and the resetting operations.

If at the beginning of an operation of the machine the indicators are at zero, the operation of the machine will be such that upon the rotation of the shaft 41, the beam 48 will be rocked on its pivotal center 50 an amount corresponding to which the beam had been rocked on its pivotal center 51 through the forward movement of the counter actuating segments but in the opposite direction. This would not be true in all cases because at times the end 51 of the beam 48 would be left at some other position than zero at the completion of an operation of the machine. In this case when the end 51 of the beam 48 is in some other position than zero, when the beam is rocked upon its pivot 51 through the forward movement of the actuating segment then upon the rotation of the shaft 41 the end 51 of the beam would be moved toward or away from its zero position according to the difference between the amount which it had been moved away from the zero position in the previous operation of the machine and the amount of forward movement of the end 50 of the beam. This construction provides for setting the corresponding indicator drum of each beam and the type segments of each beam directly to the desired position from any position in which they may have been left at the last previous operation of the machine.

The two segments 43 which control the positioning of the two indicators 410 which indicate thousands and tens of thousands of accumulated amounts, and also corresponding type segments are of course operated only in reading or resetting operations. During ordinary operations when amounts are being added to any of the totalizers these two segments are prevented from rocking upon the shaft 41 by zero plungers 6 the same as are shown in Fig. 3. These plungers are withdrawn as are all the zero plungers 6 during the reading or resetting operations so that these two segments will be limited in their forward movement by the pins 100 of their respective totalizer pinions just as are the other segments in such operations. The connecting mechanism of the indicators and printing mechanism being alike in both cases, it will also operate in a like manner.

The cash drawer is indicated at 411, Fig. 1, and may either be operated independently of the rest of the machine or arranged to be unlatched at a certain state of the operation of the machine. The cash drawer is not illustrated in detail as it forms no part of the present invention and of course is not an absolutely essential element of the machine.

It is also quite common to cash registers to be provided with mechanism for printing and issuing checks upon which are printed data concerning transactions. No check printing mechanism is shown in the drawings but the machine is designed so that a check printer may be conveniently placed below the key board.

While the form of mechanism herein shown and described is admirably adapted to fulfil the objects primarily stated it is to be understood that it is not intended to confine the invention to the one form of embodiment herein disclosed, for it is susceptible of embodiment in various forms all coming within the scope of the claims which follow.

What is claimed is as follows:

1. In an accounting machine, the combination with multiple totalizers mounted in axial alinement, of totalizer actuating mechanism, a main operating mechanism, means for bringing different sets of totalizers into operative relation with the actuating mechanism, the said means being actuated by the main operating mechanism and means for alining with the actuating mechanism the totalizer which is brought into operative relation with the actuating mechanism.

2. In an accounting machine, the combination with multiple totalizers mounted in axial alinement, of totalizer actuating mechanism, a main operating mechanism, an adjustable lever for controlling the operating mechanism, and means actuated by the operating mechanism for bringing different sets of totalizers into operative relation with the actuating mechanism.

3. In an accounting machine, the combination with multiple totalizers mounted in axial alinement, of totalizer actuating mechanism, a main operating mechanism, means actuated by the main operating mechanism for bringing different sets of totalizers into operative relation with the actuating mechanism, and a device controlling the operating mechanism for determining which set of totalizers shall be moved into operative relation with the actuating mechanism.

4. In an accounting machine, the combination with multiple totalizers, of totalizer actuating mechanism, a main operating mechanism, means driven by the operating mechanism for bringing different sets of totalizers into operative relation with the actuating mechanism, an adjustable lever for positioning said means, so that a desired set of totalizers, will be brought to operative position upon the operation of the main operating mechanism.

5. In an accounting machine, the combination with differentially movable members, of printing devices positioned thereby, a carriage for supporting several rolls of paper, a main operating mechanism, and means operated by the main operating mechanism for positioning the carriage so that different rolls of paper will be brought to printing position.

6. In an accounting machine, the combination with printing devices, of a carriage supporting several rolls of paper, a main operating mechanism, and means operated by the main operating mechanism for positioning the carriage so that different rolls of paper will be brought to the printing position, means for feeding the paper which is in printing position and means preventing the feed of the paper which is not in the printing position.

7. In an accounting machine, the combination with printing devices, of a carriage supporting several rolls of paper, a main operating mechanism, and means operated by the main operating mechanism for positioning the carriage so that different rolls of paper will be brought to the printing position, and means for feeding the paper which is in printing position.

8. In an accounting machine, the combination with printing devices, of a carriage supporting several rolls of paper, multiple totalizers, actuating devices for the totalizers, a main operating mechanism, means actuated by the operating mechanism for bringing different rolls of paper into printing position, said means also serving to bring different sets of totalizers into operative relation with the actuating devices.

9. In an accounting machine, the combination with printing devices, of a carriage supporting several rolls of paper, multiple totalizers, actuating devices for the totalizers, means for bringing different rolls of paper into printing position, said means also serving to bring different sets of totalizers into operative relation with the actuating devices.

10. In an accounting machine, the combination with multiple totalizers, of actuating devices for the same, printing devices, a carriage for rolls of paper, a main operating mechanism, means operated by the operating mechanism for bringing different sets of totalizers into operative relation with the actuating devices said means also positioning said carriage to bring a corresponding roll of paper to the printing position.

11. In an accounting machine, the combination with printing devices, a carriage for rolls of paper, means for moving different rolls into printing position, operating mechanism, and a device operated by the operating mechanism which accurately alines the roll of paper, which is brought to the printing position with the printing devices.

12. In an accounting machine, the combination with multiple totalizers, of totalizer actuating mechanism, a main operating mechanism, means driven by the operating mechanism for bringing different totalizers into operative relation with the actuating mechanism, an adjustable lever for positioning said means so that a desired set of totalizers will be brought to operative position upon the operation of the machine, and mechanism for returning the lever to a normal position upon the completion of the operation of the main operating mechanism.

13. In an accounting machine, the combination with a plurality of totalizers, of totalizer actuating mechanism, an adjustable means for bringing different totalizers into operative relation with the actuating mechanism, and means for automatically bringing a particular totalizer into operative relation with the actuating mechanism if the said adjustable means is not otherwise moved.

14. In an accounting machine the combination with a plurality of totalizers, of a carriage for rolls of paper, totalizer actuating mechanism which normally operates on a particular totalizer, a printing device which normally operates on a particular roll of paper, adjustable means for causing a different totalizer to be engaged by the actuating mechanism and a different roll of paper to be printed upon by the printing devices upon the operation of the machine, and means automatically bringing the first mentioned totalizer and roll of paper into operative relation with the totalizer actuating mechanism and the printing device if the said adjustable means is not otherwise moved.

15. In an accounting machine, the combination with a carriage for rolls of paper, of a printing device, adjustable means for moving said carriage for bringing different rolls of paper into printing position, and means for automatically bringing a particular roll of paper into printing position if the said adjustable means is not otherwise moved.

16. In an accounting machine, the combination with a totalizer of a totalizer actuating device, a main operating mechanism, differently timed cams driven by the operating mechanism, a shifting device for moving the totalizer into and out of mesh with the actuating device, and means for connecting said shifting device with any of said cams.

17. In an accounting machine, the combination with operating mechanism of a plurality of totalizers and actuating mechanism for the same, means operated by the operating mechanism for shifting different totalizers into mesh with the actuating mechanism, a resetting mechanism operated by the operating mechanism and means for preventing the simultaneous operation of the totalizer shifting and resetting mechanisms.

18. In an accounting machine, the combination with a series of totalizer pinions, actuating segments for the same, pins carried by the totalizer pinions, transfer pawls in the paths of said pins which will be tripped when their respective totalizer pinion has revolved a certain distance, said transfer pawls controlling an extra unit of movement of the segments of next higher denomination, means for holding the pawls in their tripped positions, and means for positively returning the pawls into the paths of the said pins.

19. In an accounting machine, the combination with a plurality of totalizers, of an actuating device for the same, a lever for causing the shifting of any totalizer into operative relation with the actuating device, said lever requiring only an ordinary operation for moving some of the totalizers into operative position while requiring a special operation for moving another of the totalizers into operative position.

20. In an accounting machine, the combination with a plurality of totalizers, of an actuating device for the same, a lever for shifting any totalizer into operative relation with the actuating device, means for automatically returning said lever to a normal position at the completion of an operation of the machine.

21. In an accounting machine, the combination with a totalizer of actuating mechanism for the same, indicators for exhibiting amounts added to the totalizer, and means for causing the totalizer to control the indicators so as to indicate the total amount added to the totalizer.

22. In an accounting machine, the combination with a totalizer, of an actuator for the same, means for differentially moving the actuator, indicator mechanism, a beam pivotally connected at one end to the actuator and at its other end to the indicator mechanism, a device for locking the indicator mechanism while the actuator is being moved, a device for locking the actuator in its moved position, means for unlocking the indicator mechanism when the actuator is locked, and mechanism which then positions the end of the beam which is secured to the indicator mechanism according to the position that its opposite end has been moved to and thereby set the indicators accordingly.

23. In an accounting machine, the combination with a totalizer, of an actuator for operating the same, means for differentially moving the actuator indicators and operating mechanism therefor, a beam pivotally connected at one end to the side of the actuator and pivotally connected at its other end to the indicator operating mechanism, a device for locking the indicator mechanism while the actuator is being moved and a device for locking the actuator in its moved position, means for unlocking the indicator mechanism when the actuator is locked, and mechanism which then rocks the end of the beam which is secured to the indicator mechanism a distance corresponding to the distance to which its opposite end has been rocked by the actuator and thereby rotate the indicators accordingly.

24. In an accounting machine, the combination with a totalizer, of an actuating device for differentially rotating the same, a printing device and means for causing the same to print the amounts which are added to the totalizer, a resetting key which when operated will cause the printing device to print the total amount accumulated by the totalizer and the resetting of the totalizer to zero, value keys, means operated by the value keys for preventing depression of the resetting key when any of the value keys are depressed indicators, and means for preventing the operation of the resetting key unless all of the indicators are at zero position.

25. In an accounting machine, the combination with a totalizer and means for actuating the same, of an indicator, a resetting device for the totalizer, and means preventing the operation of the resetting device if the indicator is moved out of its zero position.

26. In an accounting machine the combination with a totalizer, of operating mechanism, a motor for driving the operating mechanism, a motor switch, means for closing said switch, clerks' keys, a member for preventing the operation of the motor switch, said member arranged to be disengaged from the switch mechanism upon the depression of any of the clerks' keys, a motor key normally preventing the operation of the switch mechanism, means whereby the depression of the motor key will cause the motor key to permit the operation of the switch mechanism.

27. In an accounting machine, the combination with a totalizer, of operating mechanism, a motor for driving the operating mechanism, a motor switch, means for closing said switch, a plurality of keys, a counter resetting key, a member for preventing the closing of the motor switch, means operated by the depression of either one of the first mentioned keys or the resetting key for causing said member to permit the closing of the motor switch.

28. In an accounting machine, the combination with a totalizer and a manipulative device controlling the resetting thereof, of a totalizer positioning device, a locking device for said manipulative device constructed to coact with a point on said positioning device, and means for restoring said coacting point on said positioning device to a constant position at each operation of the accounting machine.

29. In an accounting machine, the combination with a totalizer and a manipulative device controlling the resetting thereof, of a totalizer setting beam, a manipulative device connected to one end of said beam, a totalizer setting element connected to the other end of said beam, means for restoring a point of said beam to a constant position at each operation of the accounting machine, and a locking device for said first manipulative device positioned to coact with said point of the beam.

30. In an accounting machine, the combination with a plurality of totalizer pinions mounted in axial alinement, a totalizer actuating device, means for axially shifting the totalizer pinions to bring any pinion into operative relation with the actuating device, and an alining device constructed to correct an inaccurate axial positioning of the totalizer pinions.

31. In an accounting machine, the combination with a totalizer, an actuator for the same, and means for engaging said actuator and said totalizer, of a pair of differently timed cams, and manipulative devices for connecting said engaging means to be operated by either of the cams as desired.

32. In an accounting machine, the combination with a totalizer, of indicators, a resetting device for the totalizer, means for preventing the operation of the resetting device if the indicators are out of zero position, said means permitting the indicators to be moved out of zero position when the resetting device is in operative position.

33. In an accounting machine, the combination with type-carriers of means for differentially moving the same, a type-hammer for each of the carriers, a dog pivoted to each type-hammer, an actuator for the hammers, said type-carriers arranged to engage the dogs of their respective hammers when moved so that the dogs engaged will rock into the path of the actuator, means for driving the actuator, and a cam surface engaged by said actuator during its stroke so as to become disengaged from the type-hammers.

34. In an accounting machine, the combination with type-carriers and means for differentially positioning any of the same, type hammers, springs connecting the hammers with a fixed part of the machine, means for moving the hammers of such of the type-carriers as are moved to printing position so that the springs of the respective hammers will be tensioned, and means for then releasing the hammers.

35. In an accounting machine, the combination with the printing mechanism, of a carriage for rolls of paper, means for moving the carriage differentially to bring different rolls into printing position, operating means, and a device operated by the operating means, for accurately alining the carriage in its moved position so that the desired paper roll is in its exact printing position.

36. In an accounting machine, the combination with a plurality of totalizer pinions mounted in axial alinement, a totalizer actuating device, means for axially shifting the totalizer pinions to bring any pinion into operative relation with the actuating device, and a pointed alining pin movable with the totalizer and adapted to enter holes in a fixed member to correct an inaccurate axial positioning of the totalizer pinions.

37. In an accounting machine, the combination with a set of actuating devices, of a plurality of totalizers each comprising denominational elements, corresponding denominational elements of the totalizers being positioned in groups, of devices for shifting all said totalizers differentially so as to bring any desired totalizer into cooperative relation with said actuating devices, a main operating mechanism for the machine and connections therefrom for actuating said shifting devices, and a hand lever controlling said shifting devices.

38. In an accounting machine, the combination with a set of actuating devices, of a plurality of totalizers each comprising denominational elements, corresponding denominational elements of the totalizers being positioned in groups, a rod carrying all said totalizer elements, a main operating mechanism, connections whereby said operating mechanism may variably shift said rod axially and thereby bring any desired totalizer into coöperation with said actuating devices, and a hand lever having connections to control and determine the extent of such axial shifting.

39. In an accounting machine, the combination with a plurality of totalizers each comprising denominational elements and a set of actuators therefor, of a supporting device on which all said denominational elements are carried, a hand lever, a main operating mechanism, connecting devices from said main operating mechanism for differentially sliding said supporting device and said totalizers laterally, and connections whereby said hand lever controls the extent of said sliding movement.

40. In an accounting machine, the combination with a set of actuating devices, of a plurality of totalizers actuated thereby and each comprising denominational elements, a rod for supporting all said denominational elements, a frame having slots carrying said rod, and a main operating mechanism having connections for differentially shifting said rod axially across said slots and other connections for moving said rod along said slots to a constant extent.

41. In an accounting machine, the combination with a set of actuating devices, of a plurality of totalizers actuated thereby and each comprising denominational elements, a rod on which all said elements are mounted, a frame having slots carrying said rod, a main operating mechanism, having connections for differentially shifting said rod axially across said slots, and a cam driven by said main operating mechanism, and connected to slide said rod along said slots to a constant extent.

42. In an accounting machine, the combination with a set of actuators, of a plurality of totalizers actuated thereby and each comprising denominational elements, a supporting device for said totalizers, a frame having slots in which said supporting device rides, a main operating mechanism, connections from said main operating mechanism for differentially sliding said supporting device across said slots and other connections from said operating mechanism for sliding said supporting device along said slots to a constant extent.

43. In an accounting machine, the combination with a set of actuators and a plurality of totalizers actuated thereby, and each comprising denominational elements, of a supporting device for all said denominational elements, a main operating mechanism, separate connections driven by said operating mechanism for shifting said supporting device both across and in the planes of the actuators, the connections for shifting across the actuator planes being timed to operate only after the supporting device has been shifted away from the actuators in their planes.

44. In an accounting machine, the combination with a set of actuators, and a plurality of totalizers actuated thereby and each including denominational elements, of a supporting device for all said totalizers, a main operating mechanism, connections from said main operating mechanism for differentially shifting said supporting device across the planes of the actuators, and connections from said operating mechanism for moving said supporting device away from said actuators and in their planes, said first connections being timed to shift said supporting device only after it has been moved away from said actuators by said latter connections.

45. In an accounting machine, the combination with a totalizer and actuating devices therefor, of a main operating mechanism including two sets of connecting devices comprising differently timed cams, devices for engaging and disengaging said totalizer and said actuating devices, and manipulative devices for connecting said engaging devices to one of said cams and thereby disconnecting said engaging devices from the other of said cams.

46. In an accounting machine, the combination with a totalizer and actuating devices therefor, of a main operating mechanism including two differently timed cams, devices for engaging and disengaging said totalizer and said actuating devices, normally connected to one of said cams, and a hand operated element having connections to disconnect said engaging devices from one cam and connect them to the other cam.

47. In an accounting machine, the combination with a totalizer and actuating devices therefor, of a main operating mechanism including two differently timed cams, and levers operated by said cams, devices for engaging and disengaging said totalizer and said actuating devices, including a pivoted element normally connected to one of said levers, and a hand operated element having connections to disconnect said pivoted element from said normally connected lever and to connect the same to the other lever.

48. In an accounting machine, the combination with a totalizer and actuating devices therefor, of a main operating mechanism including two differently timed cams, devices for engaging and disengaging said totalizer and said actuating devices normally connected to one of said cams, and a hand operated element having connections movable to disconnect said engaging devices from said normally connected cam and to connect the same to said other cam or not as desired.

49. In an accounting machine, the combination with a totalizer and actuating devices therefor, of a main operating mechanism including two differently timed cams and levers operated by said cams, devices including a pivoted element normally connected to one of said levers, for engaging and disengaging said totalizer and said actuating devices, and a hand operated element having connections to disconnect said pivoted element from said normally connected lever, and to connect the same to said other lever or not as desired.

50. In an accounting machine, the combination with type carriers, of pivoted type hammers for taking impressions therefrom, pawls on said hammers positioned to be projected by said type carriers, a common retracting device for said hammers positioned to engage said pawls when projected, and a relatively stationary part positioned to disengage said retracting device from said pawls.

51. In an accounting machine, the combination with type carriers, of type hammers for taking impressions therefrom, connecting devices on said hammers positioned to be projected by said type carriers when said carriers are out of normal zero position, a retracting mechanism for said hammers movable to engage said connecting devices when projected, and a releasing device for disengaging said retracting mechanism and said projected connecting devices.

52. In an accounting machine, an accounting device, a plurality of cams controlling mechanism for effecting different accounting operations of the accounting device, and means for making any desired cam effective or ineffective.

53. In an accounting machine, a printing mechanism, a carriage for a plurality of rolls of record paper, a spirally threaded shaft and means for differentially rotating the same, a threaded member on said carriage for coacting with the threaded shaft so that the carriage may be differentially set with respect to the printing mechanism by rotation of the shaft.

54. In an accounting machine, the combination with a carriage, of a plurality of accounting devices mounted thereon, a spirally threaded shaft and means for differentially rotating the shaft, a nut coacting with said shaft and secured to said carriage, and an actuating device for said accounting devices so positioned that differential rotation of said shaft will bring different accounting devices into coöperation with the actuating device.

55. In an accounting machine, the combination with a type-carrier, of means for differentially setting the type-carrier, a type hammer, a spring for actuating the type hammer, and means whereby movement of the type-carrier controls tensioning of the spring.

56. In an accounting machine, the combination with a setting lever, of accounting devices controlled thereby, and a device mounted on the setting lever so arranged that an operation of said device and the setting lever is required to set the lever to one position while the setting lever may be moved to any other position independently of an operation of said device.

57. In an accounting machine, the combination with a setting lever, of accounting devices controlled thereby, and a device mounted on the setting lever so arranged that an operation of said device is necessary to set the lever to a certain position.

58. In an accounting machine, the combination with a totalizing device, of manipulative devices, recording mechanism constructed to record amounts as determined by said manipulative devices, driving mechanism, mechanism operated by said driving mechanism and controlled by said totalizing device for causing the recording mechanism to print totals, and devices making impossible a printing of totals before said driving mechanism is given a non-amount recording operation.

59. In an accounting machine, the combination with a plurality of accounting devices, an accounting device actuating mechanism, positioning mechanism for placing any accounting device in operative relation with the actuating mechanism, a member for controlling resetting of the accounting device, and means for preventing operation of said member except when the position of the accounting devices and the position of said positioning mechanism coincide.

60. In an accounting machine, the combination with a plurality of totalizers, of an actuating device for the same, a lever adjustable as a preliminary to an operation of the machine to control the shifting of any totalizer into operative relation with the actuating device, and means for automatically returning said lever to a normal position.

61. In an accounting machine, the combination with a set of actuating devices, of a plurality of totalizers each comprising denominational elements, corresponding denominational elements of the totalizers being positioned in groups, of devices for shifting all said totalizers differentially so as to bring any desired totalizer into coöperative relation with said actuating devices, a main operating mechanism for the machine and connections therefrom for actuating said shifting devices, and a manipulative device controlling said shifting devices.

62. In an accounting machine, the combination with driving mechanism, of a type carrier, manipulative means setting mechanism for the type carrier driven by said driving mechanism as controlled by the manipulative means and adapted to differentially adjust the type carrier from one position to another without the necessity of bringing the type carrier to zero position during such adjustment.

63. In an accounting machine, a plurality of accounting devices, a plurality of cams controlling mechanism for effecting different accounting operations of any desired one of said accounting devices, means for making any desired cam effective or ineffective and means for placing any desired one of said totalizers under control of said cams.

64. In an accounting machine, the combination of a plurality of totalizers, an actuating device therefor, means effective upon an operation of the machine for establishing a coöperative relation between said actuating device and any desired one of said totalizers, and a lever adjustable as a preliminary to an operation of the machine to predetermine the totalizer to be actuated.

65. In an accounting machine, the combination of a plurality of totalizers, an actuating device therefor, means effective upon an operation of the machine for establishing a coöperative relation between said actuating device and any desired one of said totalizers, a lever adjustable as a preliminary to an operation of the machine to predetermine the totalizer to be actuated, and means for automatically restoring said lever to a normal position at the end of the operation of the machine.

66. In an accounting machine, the combination with a plurality of totalizers, of an actuating device for the same, a lever adjustable as a preliminary to an operation of the machine to control the shifting of any totalizer into operative relation with the actuating device, and means effective upon an operation of the machine for shifting the selected totalizer.

67. In an accounting machine, the combination with a plurality of totalizers, of an actuating device for the same, a lever adjustable as a preliminary to an operation of the machine to control the shifting of any totalizer into operative relation with the actuating device, means effective upon an operation of the machine for shifting the selected totalizer, and means for automatically returning said lever to a normal position at the end of the operation of the machine.

68. In an accounting machine, the combination of a plurality of record strips, of recording means common to all of said strips, a lever adjustable as a preliminary to an operation of the machine to control the shifting of any one of said strips into coöperative relation with the recording means, and means for automatically returning said lever to a normal position.

69. In an accounting machine, the combination with a plurality of record strips, of recording mechanism common to all of said strips, a lever adjustable as a preliminary to an operation of the machine to control the shifting of any desired one of said strips into coöperative relation with the recording mechanism, and means effective upon an operation of the machine for shifting the selected record strip.

70. In an accounting machine, the combination with a plurality of record strips, of recording mechanism common to all of said strips, a lever adjustable as a preliminary to an operation of the machine to control the shifting of any desired one of said strips into coöperative relation with the recording mechanism, means effective upon an operation of the machine for shifting the selected record strip, and means for automatically returning said lever to a normal position at the end of the operation of the machine.

71. In an accounting machine, the combination of a plurality of record strips mounted on a movable frame, of a recording means common to all of said strips, a lever adjustable as a preliminary to an operation of the machine to control the movement of said frame to bring any desired one of said strips into coöperative relation with the recording means, and means for automatically returning said lever to a normal position.

72. In an accounting machine, the combination of a plurality of record strips mounted on a movable frame, of a recording means common to all of said strips, a lever adjustable as a preliminary to an operation of the machine to control the movement of said frame to bring any desired one of said strips into coöperative relation with the recording means, and means effective upon an operation of the machine for moving said frame.

73. In an accounting machine, the combination of a plurality of record strips mounted on a movable frame, of a recording means common to all of said strips, a lever adjustable as a preliminary to an operation of the machine to control the movement of said frame to bring any desired one of said strips into coöperative relation with the recording means, means effective upon an operation of the machine for moving said frame, and means for automatically returning said lever to a normal position at the end of the operation of the machine.

74. In an accounting machine, the combination of a plurality of record strips, recording means common to all of said strips, means effective upon an operation of the machine for establishing a coöperative relation between said recording means and any desired one of said record strips, and manipulative means operable as a preliminary to an operation of the machine to predetermine the record strip to be operated.

75. In an accounting machine, the combination with driving means, releasing means therefor, a series of special keys and means compelling an operation of said releasing means and one of said special keys to render said driving means effective.

76. In an accounting machine, the combination with driving means, releasing means therefor, a series of special keys, means compelling an operation of said releasing means and one of said special keys to render said driving means effective, and means preventing a second operation of the driving means until said releasing means is allowed to return to normal position.

77. In an accounting machine, the combination with a printing mechanism, of a frame supporting several rolls of paper, multiple totalizers, an actuating device for the totalizers, means for effecting a relative movement between the printing mechanism and the paper rolls to establish a printing relationship between any one of the rolls and the printing mechanism, said means also serving to establish operative relationship between different totalizers and the actuating device and means for feeding only the paper roll which is in printing relationship with the printing mechanism.

78. In an accounting machine, the combination with differentially movable members, of printing mechanism positioned thereby, a frame for supporting several rolls of paper, a main operating mechanism, means operated by the main operating mechanism for effecting a relative movement between the printing mechanism and the frame to establish a printing relationship between one of the rolls and the printing mechanism, and means for feeding only the paper roll which is in printing relationship with the printing mechanism.

79. In an accounting machine, the combination with a frame supporting several rolls of paper, of a printing device, adjustable means for establishing a printing relationship between the printing device and any roll of paper, and means for automatically establishing a printing relationship between the printing device and a particular roll of paper if the said adjustable means is not otherwise moved.

80. In an accounting machine, the combination with a plurality of totalizers, of totalizer actuating mechanism, an adjustable lever for establishing operative relationship between the actuating mechanism and any totalizer, and means for automatically establishing operative relationship between the actuating mechanism and a particular totalizer if the adjustable lever is not otherwise moved.

81. In an accounting machine, the combination with a set of actuating devices, of a plurality of totalizers actuated thereby and each comprising denominational elements, a rod for supporting all of said denominational elements, differential mechanism for differentially shifting said rod axially, means for moving said rod at right angles to the axial movement and to a constant extent, and differently timed cams controlling the time of movement of the rod to a constant extent.

82. In an accounting machine, the combination with manipulative devices, of differential mechanism controlled thereby, a motor driven operating means normally inoperative for driving said mechanism, a manipulative device for controlling the operation of said motor driven operating means and means compelling the operation of any one of the first mentioned manipulative devices and the second mentioned manipulative device to render the motor driven operating means operative, said compelling means being constructed to permit the operation of said manipulative devices in any order.

83. In an accounting machine, the combination with a totalizer, of resetting mechanism therefor, a motor driven operating means normally locked from operation for driving the resetting mechanism, a motor key controlling the operation of said motor driven operating means, a resetting key, and means compelling the operation of both the motor key and resetting key in a resetting operation to release said operating means, and constructed to permit the operation of said keys for this purpose in any order or simultaneously.

84. In an accounting machine, the combination with driving means, of releasing means therefor, a series of special keys, and means compelling an operation of said releasing means and one of said special keys to render said driving means effective and constructed to permit said releasing means and any one of said keys to be operated in any order or simultaneously for this purpose.

85. In an accounting machine, the combination with totalizing mechanism, means effecting different accounting operations thereof, of manipulative devices controlling said means, differential mechanism, keys controlling the same, driving mechanism, releasing means therefor, and means compelling the operation of one of said manipulative devices and the releasing means or one of said keys and the releasing means to render said driving mechanism effective.

86. In an accounting machine, the combination with totalizing mechanism, means effecting different accounting operations thereof, manipulative devices controlling said means, differential mechanism, keys controlling the same, driving mechanism, releasing means therefor, and means compelling the operation of one of said manipulative devices and the releasing means or one of said keys and the releasing means to render said driving mechanism effective and so constructed that the releasing means and one of the keys or manipulative devices may be operated in any order to accomplish this purpose.

87. In an accounting machine, the combination with totalizing mechanism, means effecting different accounting operations thereof, manipulative devices controlling said means, differential mechanism, keys controlling the same, driving mechanism, releasing means therefor, means compelling the operation of one of said manipulative devices and the releasing means or one of said keys and the releasing means to render said driving mechanism effective and so constructed that the releasing means and one of the keys or manipulative devices may be operated in any order to accomplish this purpose, and means preventing a second operation of the driving means until said releasing means is allowed to return to normal position.

88. In an accounting machine, the combination with a plurality of totalizers, of actuating devices common thereto, means for establishing operative relationship between any totalizer and the actuating devices, a single set of indicators for exhibiting amounts added to the totalizers, and means for effecting operative relation between any totalizer and the actuators to control the set of indicators so as to indicate the total amount added to the totalizer in such relation.

89. In an accounting machine, the combination with a plurality of totalizers, of actuating mechanism common thereto for entering items on the totalizers or clearing the same, indicators for exhibiting amounts added to any totalizer, and means for causing any desired totalizer to control the indicators in a clearing operation so as to indicate the total cleared from the desired totalizer.

90. In an accounting machine, the combination with a totalizer, of actuating mechanism for entering items on the totalizer and clearing the same, indicators for exhibiting amounts added to the totalizer, and means for causing the totalizer to control the indicators so as to indicate the amount cleared from the totalizer.

91. In an accounting machine, the combination with a totalizer, of actuating mechanism for entering items on the totalizer and for actuating the same in a read operation to turn the same to zero and then restore it to its original position, and indicating mechanism for indicating the total on the totalizer in a read operation.

92. In an accounting machine, the combination with a plurality of totalizers, of actuating mechanism common thereto, indicators for exhibiting amounts added to any totalizer, and means for causing any totalizer to control the indicators so as to indicate the total amount added to any totalizer.

93. In an accounting machine, the combination with a totalizer, of means for entering amounts thereon, resetting mechanism for the totalizer, indicators for exhibiting amounts entered on the totalizer and movable directly from one position to another without first being moved to a constant position and also for exhibiting the total on the totalizer in a resetting operation, and means for preventing a resetting operation until the indicators have been moved to zero position.

94. In an accounting machine, the combination with a plurality of totalizers, of actuating means for the same, and a plurality of manipulative devices the operation of all of which is necessary to effect operative relation between one of said totalizers and the actuating means, while but one of said devices need be operated to effect operative relation between another totalizer and the actuating means.

95. In an accounting machine, the combination with a plurality of rolls of paper, of a printing device common thereto, and a plurality of manipulative devices the operation of all of which is necessary to effect relative movement between the paper rolls and the printing device to establish a printing relation between a particular paper roll and the printing device, whereas but one of said devices need be operated to establish printing relation between any of the other rolls of paper and the printing device.

96. In an accounting machine, the combination with a plurality of totalizers, of actuating means common thereto, a plurality of rolls of paper, a printing device common thereto, two manipulative devices the operation of both of which is necessary to effect the establishment of an operative relationship between a particular totalizer and the actuating means and a printing relationship between a particular roll of paper and the printing device while but one of said devices need be operated to effect the establishment of an operative relation between any other totalizer and the actuating means and a printing relation between any other roll of paper and the printing device.

97. In a machine of the class described, the combination of a paper supporting carriage, printing mechanism provided with type carriers, means for moving the carriage in either direction transversely with relation to the type carriers in a single uninterrupted movement to any desired one of a plurality of positions, and means for predetermining the extent of movement of the carriage.

98. In a machine of the class described, the combination of a paper supporting carriage, printing mechanism provided with type carriers, means for moving the carriage in either direction transversely with relation to the type carriers, to any desired one of a plurality of positions, and means for predetermining the extent of movement of the carriage.

99. In a machine of the class described, the combination of a paper supporting carriage, printing mechanism provided with type carriers, means for moving the carriage transversely with relation to the type carriers in a single uninterrupted movement to any desired one of a plurality of positions, and means for predetermining the extent of movement of the carriage.

100. In a machine of the class described, the combination of a paper supporting carriage, printing mechanism provided with type carriers, means for positively moving the carriage transversely with relation to the type carriers to any desired one of a plurality of positions, and means for predetermining the extent of movement of the carriage.

101. In a machine of the class described, the combination of a paper supporting carriage, printing mechanism provided with type carriers, means for positively moving the carriage in either direction transversely with relation to the type carriers in a single uninterrupted movement to any desired one of a plurality of positions, and means for predetermining the extent of movement of the carriage.

102. In a machine of the class described, the combination of a paper supporting carriage, printing mechanism provided with type carriers, means for moving the carriage in either direction transversely with relation to the type carriers in a single uninterrupted movement to any desired one of a plurality of positions, the carriage being moved directly from its previously moved position to the desired position, and means for predetermining the extent of movement of the carriage.

103. In a machine of the class described, the combination of a paper supporting carriage, printing mechanism provided with type carriers, means for moving the carriage transversely with relation to the type carriers to any desired one of a plurality of positions, and means for predetermining the extent of movement of the carriage.

104. In a machine of the class described, the combination of a movable carriage, provided with means for holding paper in position to be operated upon, printing mechanism having a plurality of type carriers movably mounted and provided with means for moving each of said type carriers into printing position, and means for moving the carriage transversely in either direction with relation to the type carriers directly to any one of a plurality of positions, and means for predetermining the position to which the carriage is to be moved.

105. In a machine of the class described, the combination of a movable carriage, provided with means for supporting paper in position to be operated upon, printing mechanism for printing on the paper, and means for moving the carriage different distances in either direction transversely to the printing mechanism for presenting a plurality of columns successively in printing position in any desired order, and means for predetermining the extent of movement and direction of movement of the carriage.

106. In a machine of the class described, the combination of a movable carriage, provided with means for supporting paper in position to be operated upon, printing mechanism for printing on the paper, and means for positively moving the carriage different distances in either direction transversely to the printing mechanism for presenting a plurality of columns successively in printing position in any desired order, and means for predetermining the extent of movement and direction of movement of the carriage.

107. In a machine of the class described, the combination of a carriage, an operating shaft rotatably mounted and operatively connected with said carriage, means for rotating said shaft and thereby moving the carriage in either direction to any one of a plurality of positions, and means for determining the movement of the carriage in either direction to any one of said positions.

108. In a machine of the class described, the combination of a carriage, an operating shaft rotatably mounted and operatively connected with said carriage, means for rotating said shaft in either direction and thereby moving the carriage to any one of a plurality of positions, the carriage being moved directly from its previously moved position to its desired position, and means for predetermining the extent of movement of the carriage to any desired one of said positions.

109. In a machine of the class described, the combination of a paper supporting carriage, an operating shaft rotatably mounted and operatively connected with said carriage, mechanism for rotating said shaft in either direction and thereby moving the carriage in a corresponding direction, and a hand lever for determining the extent and direction of movement of the carriage in either direction transversely to the shaft.

110. In a machine of the class described, the combination of a paper supporting carriage, an operating shaft rotatably mounted and operatively connected with such carriage, mechanism for rotating said shaft in either direction and thereby moving the carriage in a corresponding direction, and a hand lever for determining the extent and direction of movement of the carriage in either direction transversely to the shaft, the carriage being moved directly from the position to which it was moved at the previous operation to the desired position.

111. In a machine of the class described, the combination of a printing mechanism provided with type carriers, a paper supporting carriage movable in either direction transversely of said type carriers to any desired one of a plurality of printing positions, a carriage operating shaft, rotatably mounted and operatively connected with said carriage, a pinion mounted on said shaft, gear mechanism operatively connected with said pinion, manipulative means operatively connected with said gear mechanism, and means for rotating said gear mechanism.

112. In a machine of the class described, the combination of a printing mechanism, a paper supporting carriage movable in either direction transversely to said type carriers, gear mechanism operatively connected with said carriage, manipulative means, and automatic mechanism operatively connected to the said manipulative means and with the gear mechanism for rotating said gear mechanism in either direction and thereby moving the carriage in either direction transversely to the type carriers directly to any desired one of a plurality of printing positions.

113. In a machine of the class described, the combination of a carriage, printing mechanism provided with type carriers, means for moving said carriage in either direction transversely to the type carriers, directly to any desired one of a plurality of positions, means for controlling the direction and extent of movement of such carriage in either direction, and means for adding the amounts printed by the type carriers.

114. In a machine of the class described, the combination with a main operating mechanism, of a printing device, a paper supporting carriage, multiple totalizers, actuating devices for the totalizers, means operated by the operating mechanism for bringing different columns of paper into printing position, said means also serving to bring different totalizers into operative relationship with the actuating devices, and manipulative means for controlling the extent of movement of the carriage and determining the totalizer to be brought into operative relationship.

115. In a machine of the class described, the combination with a main operating mechanism, of a printing device, a paper supporting carriage, multiple totalizers, actuating devices for the totalizers, means operated by the operating mechanism for bringing different columns of paper into printing position, said means also serving to bring different totalizers into operative relationship with the actuating devices, and a hand lever for controlling the extent of movement of the carriage and determining the totalizer to be brought into operative relationship.

116. In a machine of the class described, the combination with a main operating mechanism, of a printing device, a paper supporting carriage, multiple totalizers, actuating devices for the totalizers, means operated by the operating mechanism for bringing different columns of paper into printing position, said means also serving to bring different totalizers into operative relationship with the actuating devices, the paper carriage and the totalizers being moved directly from their previously moved positions to the desired positions, and manipulative means for predetermining the position to which the carriage is to be moved and the totalizer to be brought into operative relation.

117. In a machine of the class described, the combination with a main operating mechanism, of printing devices, a paper supporting carriage, multiple totalizers, actuating devices for the totalizers, means operated by the operating mechanism for effecting relative movement between the carriage and the printing devices and the multiple totalizers and the actuating devices, so that the printing devices will print in any desired column and so that any desired totalizer is in operative relation with the actuating devices, and manipulative means for predetermining which column is to be printed in and which totalizer is to be actuated.

118. In a machine of the class described, the combination with a main operating mechanism, of printing devices, a paper supporting carriage, multiple totalizers, actuating devices for the totalizers, means operated by the operating mechanism for effecting relative movement between the carriage and the printing devices and the multiple totalizers and the actuating devices, so that the printing devices will print in any desired column and so that any desired totalizer is in operative relation with the actuating devices, said means being so constructed that any printing relation and any operative relation may be established directly from any other printing and operative relation without first establishing a constant printing and operative relation, and manipulative means for predetermining which column is to be printed in and which totalizer is to be actuated.

119. In a machine of the class described, the combination with a main operating mechanism, of a printing mechanism, a frame supporting several rolls of paper, multiple totalizers, actuating devices for the totalizers, means operated by the operating mechanism for effecting relative movement between the printing mechanism and the paper rolls to establish a printing relationship between any one of the rolls and the printing mechanism, said means also serving to establish operative relationship between the different totalizers and the actuating devices, and manipulative means for predetermining which paper roll is to be printed on and which totalizer is to be actuated.

120. In a machine of the class described, the combination of a paper supporting carriage, printing mechanism provided with type carriers, means for effecting a single uninterrupted relative movement between said carriage and type carriers to establish a coöperative relation between said carriage and carriers at any desired one of a plurality of points on said carriage, and means for predetermining the extent of said relative movement.

121. In a machine of the class described, the combination of a paper supporting carriage, printing mechanism provided with type carriers, means for effecting a relative movement between said carriage and carriers to establish a coöperative relation between the same at any desired point on said carriage, and means for predetermining the extent of said movement.

122. In a machine of the class described, the combination with a main operating mechanism, of a paper supporting carriage, printing mechanism provided with type carriers, means effective upon an operation of the main operating mechanism for effecting a relative movement between said carriage and carriers to establish a coöperative relation between the same at any desired point on said carriage, and means operable as a preliminary to an operation of said main operating mechanism for predetermining the extent of said movement.

123. In a machine of the class described, the combination with a common item entering mechanism, of a carriage movable transversely of said mechanism and consisting of side members and cross members all rigid together, a plurality of independent record retaining devices set in said carriage and supported by the cross members thereof, and a removable rod passing through openings in the side members and the record retaining devices whereby to hold said devices in position in the carriage.

124. In a machine of the class described, the combination with a common set of type carriers, of a carriage movable transversely of the type carriers and consisting of side members and cross members all rigid together, a plurality of record retaining devices set in said carriage and supported by the cross members thereof, and a removable rod passing through alined openings in the side members and the record retaining devices whereby to hold the devices in the carriage.

125. In a machine of the class described, the combination with a single set of type carriers, of a carriage movable transversely of the type carriers and consisting of side members and cross members all rigid together, a plurality of independent record strip frames formed to rest in recesses in one of the cross members and having notches to engage another cross member, and a removable rod inserted through alined openings in the side members and the record strip frames to hold the frames in position.

126. In a machine of the class described, the combination with actuators, of a plurality of totalizers arranged in axial alinement, a support for the totalizers movable transversely of the actuators to establish operative relationship between any desired totalizer and the actuators and also movable toward the actuators to engage the selected totalizer with the actuators, a stationary element having a plurality of holes positioned with reference to the various transverse positions of the totalizer support, and an alining pin rigid with said support and so positioned thereon that the pin will be opposite the proper hole at any transverse position of the support, movement of the support toward the actuators then engaging the pin with the hole.

In testimony whereof we affix our signatures in the presence of two witnesses.

CHARLES F. KETTERING.
WILLIAM A. CHRYST.

Witnesses:
 Roy C. Glass,
 Carl W. Benst.

DISCLAIMER.

1,151,190.—*Charles F. Kettering* and *William A. Chryst*, Dayton, Ohio. MULTIPLE CASH REGISTERS AND RECORDERS. Patent dated August 24, 1915. Disclaimer filed July 19, 1926, by the assignee by mesne assignments, *The National Cash Register Company*.

Hereby enters this disclaimer to that part of the claim in said specification which is in the following words, to wit:

"34. In an accounting machine, the combination with type-carriers and means for differentially positioning any of the same, type hammers, springs connecting the hammers with a fixed part of the machine, means for moving the hammers of such of the type-carriers as are moved to printing position so that the springs of the respective hammers will be tensioned, and means for then releasing the hammers.

"55. In an accounting machine, the combination with a type-carrier, of means for differentially setting the type-carrier, a type hammer, a spring for actuating the type hammer, and means whereby movement of the type-carrier controls tensioning of the spring."

[*Official Gazette August 17, 1926.*]